US012202317B1

(12) United States Patent
Sawant et al.

(10) Patent No.: US 12,202,317 B1
(45) Date of Patent: Jan. 21, 2025

(54) HEAT LOAD BALANCING IN VEHICLES

(71) Applicant: Zoox, Inc., Foster City, CA (US)

(72) Inventors: Rahul Dhananjay Sawant, San Mateo, CA (US); Srinivasa Rao Vaddiraju, Troy, MI (US); Samay Shah, Oakland, CA (US); Paul Raymond Mueller, San Leandro, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

(21) Appl. No.: 17/737,764

(22) Filed: May 5, 2022

(51) Int. Cl.
*B60H 1/00* (2006.01)

(52) U.S. Cl.
CPC ................................ *B60H 1/00885* (2013.01)

(58) Field of Classification Search
CPC .................................................. B60H 1/00885
See application file for complete search history.

(56) References Cited

U.S. PATENT DOCUMENTS 6,332,330 B1 * 12/2001 Loup .................. B60H 1/00028 237/12.3 A
7,451,608 B2 * 11/2008 Kikuchi .................... B60L 7/14 62/186
7,988,543 B2 * 8/2011 Major ..................... B60L 3/003 454/107
9,517,678 B2 * 12/2016 Matsuda ............ B60H 1/00278
9,914,336 B2 * 3/2018 Smith ...................... B60L 50/66
10,668,926 B2 * 6/2020 Birnschein ............... B60Q 1/04
10,737,737 B2 8/2020 Birnschein et al.
10,843,550 B2 * 11/2020 Wong ......................... B60L 1/02
10,985,391 B2 * 4/2021 Farnsworth ....... H01M 8/04014
11,094,950 B2 * 8/2021 Folick ............... H01M 8/04358
11,104,394 B2 * 8/2021 Birnschein .............. B60L 50/50
11,279,206 B1 3/2022 Mueller et al.
11,407,462 B2 * 8/2022 Birnschein ............ B60W 10/18
11,482,059 B2 * 10/2022 Claessens ............ G07C 5/0816
11,551,660 B1 * 1/2023 Baker ................. B60R 11/0247
11,612,084 B1 * 3/2023 Swatko .............. H05K 7/20881
(Continued)

FOREIGN PATENT DOCUMENTS

DE 1623158 A1 * 4/1971
DE 102011077339 A1 * 12/2011 ......... B60H 1/00278
(Continued)

OTHER PUBLICATIONS

Sawant, et al., U.S. Appl. No. 18/087,014, filed Dec. 22, 2022, Titled "Cooling System Assembly for Bidirectional Vehicle", 55 pages.

*Primary Examiner* — Ljiljana V. Ciric
(74) *Attorney, Agent, or Firm* — Lee & Hayes, P.C.

(57) ABSTRACT

Techniques for providing heat load balancing in an autonomous bi-directional vehicle utilize a first coolant loop thermally coupled to a first drive motor and a first end of the autonomous bi-directional vehicle and a second coolant loop thermally coupled to a second drive motor and a second end of the autonomous bi-directional vehicle to exchange thermal energy. A conduit thermally couples the first coolant loop with the second coolant loop to allow transfer of the coolant in between. A controller is usable to increase an amount of thermal energy transferred between the first coolant loop and the second coolant loop based at least in part on a direction of travel of the autonomous bi-directional vehicle.

7 Claims, 11 Drawing Sheets

(56) References Cited

U.S. PATENT DOCUMENTS

| | | | | |
|---|---|---|---|---|
| 11,659,696 | B2 * | 5/2023 | McEathron | G06F 1/20 361/679.47 |
| 11,673,448 | B2 * | 6/2023 | Cohan | H01M 10/613 62/79 |
| 11,685,456 | B2 * | 6/2023 | Birnschein | B60H 1/00392 701/22 |
| 11,745,612 | B1 * | 9/2023 | Ocampo Villegas | B60L 53/122 429/120 |
| 11,884,127 | B2 * | 1/2024 | Jeong | B60K 11/04 |
| 2005/0138941 | A1 * | 6/2005 | Kikuchi | B60H 1/00278 62/244 |
| 2008/0139102 | A1 * | 6/2008 | Major | B60H 1/00278 454/139 |
| 2011/0162901 | A1 * | 7/2011 | Lucas | B60L 1/003 180/68.2 |
| 2011/0165830 | A1 * | 7/2011 | Smith | B60H 1/00278 454/75 |
| 2016/0207418 | A1 * | 7/2016 | Bergstrom | B60G 3/06 |
| 2018/0345777 | A1 * | 12/2018 | Birnschein | B60K 8/00 |
| 2018/0345971 | A1 * | 12/2018 | Birnschein | B60R 16/0231 |
| 2019/0165387 | A1 * | 5/2019 | Farnsworth | B60L 1/003 |
| 2019/0165394 | A1 * | 5/2019 | Folick | H01M 8/04723 |
| 2019/0280320 | A1 * | 9/2019 | Farnsworth | B60L 58/33 |
| 2019/0351732 | A1 * | 11/2019 | Rajaie | B60H 1/00392 |
| 2020/0398915 | A1 * | 12/2020 | Birnschein | B60L 3/0023 |
| 2021/0068312 | A1 * | 3/2021 | Tobiassen | H01M 10/663 |
| 2023/0211705 | A1 * | 7/2023 | Zeamer | B60K 11/04 180/68.1 |

FOREIGN PATENT DOCUMENTS

| | | | | | |
|---|---|---|---|---|---|
| DE | 102016112089 | A1 | * | 1/2018 | B60H 1/00278 |
| DE | 102020210454 | A1 | * | 5/2021 | B60H 1/00271 |
| EP | 4292912 | A2 | * | 12/2023 | B60H 1/00392 |
| FR | 2798323 | A1 | * | 3/2021 | B60H 1/00028 |
| GB | 2606678 | A | * | 11/2022 | B60H 1/00271 |
| KR | 20230088316 | A | * | 6/2023 | |

* cited by examiner

HEAT LOAD BALANCING IN VEHICLES

BACKGROUND

Thermal control is important in vehicle operation. Various parts such as motors, batteries, pumps, computers, etc., generate heat when the vehicle is in motion or even in charging. Quite often, when a bi-directional vehicle travels in one direction, the leading end of the vehicle (i.e., the end oriented in a direction of travel) receives higher airflow than the trailing end of the vehicle (i.e., the end opposite the direction of travel). This uneven airflow can result in unbalanced heat load at the vehicle. Unbalanced heat load may result in ineffective cooling of certain components, which can result in a shortened driving range, and/or failure to adequately maintain a desired temperature in passenger compartment cabin comfort requirements on the trailing end in certain condition. Therefore, it is desired that the vehicle be able to balance the heat load, particularly when the vehicle is in motion.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

DETAILED DESCRIPTION

Figure 1:
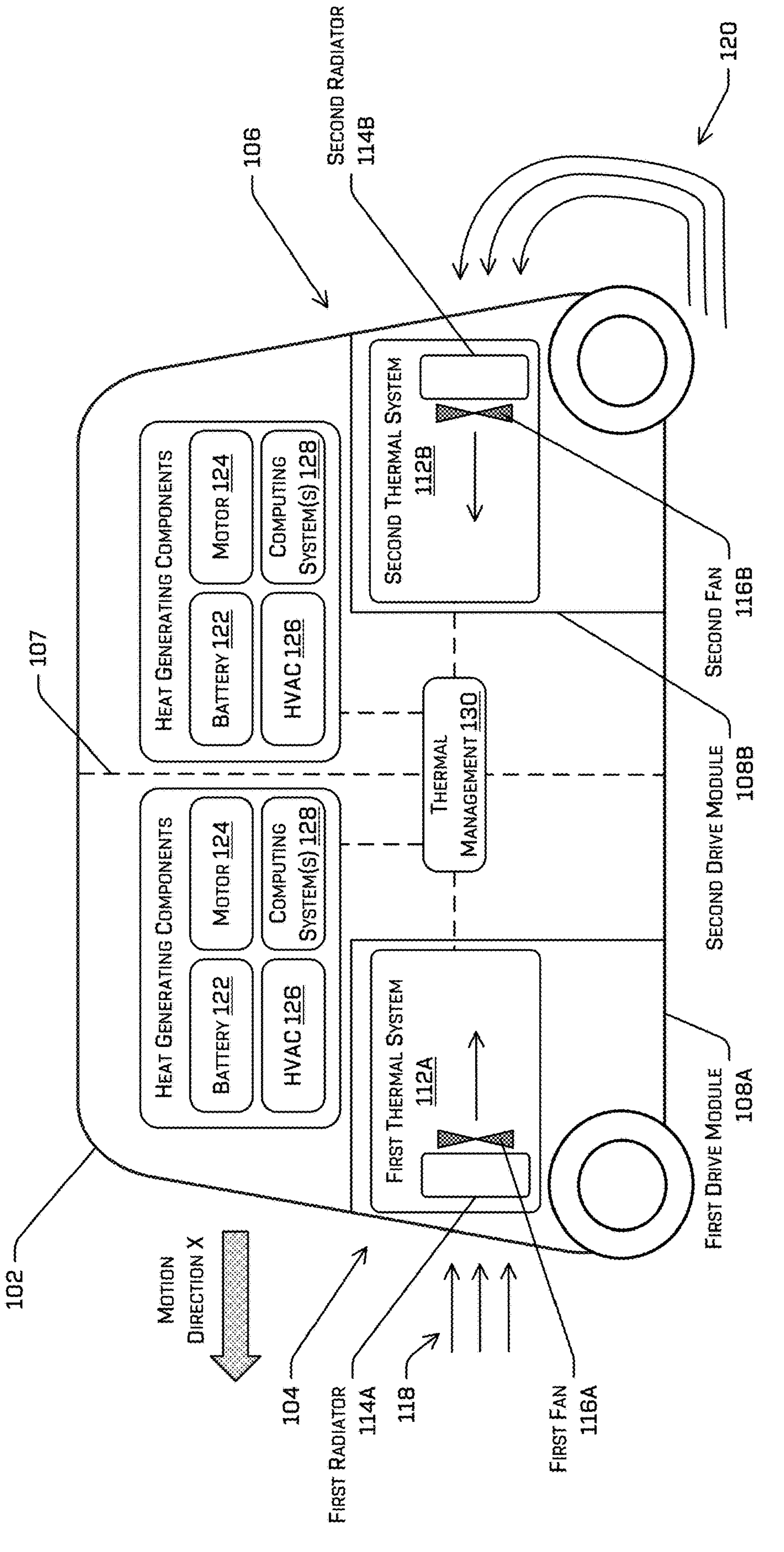
FIG. 1 illustrates an example scenario depicting an autonomous vehicle 102, in accordance with examples of the disclosure.

Techniques for heat load balancing a vehicle are discussed herein. The systems and techniques described herein may be applicable to many types of vehicles, although aspects of the disclosure may be particularly applicable to autonomous vehicles and/or vehicles with bidirectionality, e.g., configured to move forward in either of two, opposite directions, as described further herein. In some implementations, the heat load balancing may be achieved by coupling a first coolant loop coupled to a first drive module of the first end of the vehicle with a second coolant loop coupled to a second drive module of the second end of the vehicle. The thermal energy can be transferred to either the first coolant loop or the second coolant loop based at least in part on a direction of travel of the vehicle, where either the first end or the second end is a leading end of the direction of travel.

In some examples, each of the first coolant loop and the second coolant loop includes a respective pump used to pump the coolant to circulate in the respective coolant loop. In some examples, the speeds of the pumps may be set to generate a pressure differential between the first coolant loop and the second coolant loop such that the coolant flows from the leading end to the trailing end (i.e., opposite to the direction of travel). In some examples, each of the first coolant loop and the second coolant loop includes a respective valve that is actuated by a controller component of the vehicle. The openings of the valves are controlled to allow a certain amount of coolant to flow from one end to another.

In some examples, each of the first coolant loop and the second coolant loop includes a respective radiator used to dissipate the thermal energy to the ambient air outside the vehicle. The coolant loop including the radiator may be also referred to as a high temperature coolant loop. The high temperature coolant loops at the first end and the second end of the vehicle may be coupled together by valves that are actuated by a controller component. The controller component may set the openings of the valves to allow a certain amount of coolant to flow from either high temperature coolant loop to another high temperature coolant loop.

In some examples, each of the first coolant loop and the second coolant loop includes a respective chiller that stores the coolant to cool the temperatures of various components inside the vehicle. The coolant loop including the chiller may be also referred to as a low temperature coolant loop. In implementations, each of the low temperature loops may also include a respective valve and a respective pump to control the coolant flow volume. In implementations, the low temperature coolant loops on the first end and the second end may be coupled together and/or fluidly communicated with each other by a conduit.

In some examples, by adjusting the speeds of the pumps and the openings of the valves of the low temperature coolant loops, a certain amount of coolant can be driven from the low temperature coolant loop at the leading end to the low temperature coolant loop at the trailing end until a desired amount of thermal energy is exchanged. In some examples, the conduit that couples the low temperature coolant loops may also include one or more additional valves. The controller component of the vehicle may further set the openings of the one or more additional valves to control the amount of coolant from the leading end to the trailing end.

FIG. 1 illustrates an example scenario depicting an autonomous vehicle 102, in accordance with examples of the disclosure.

The autonomous vehicle 102 may be configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 102 may be a fully or partially autonomous vehicle having any other level or classification. Moreover, in some examples, the heat load balancing techniques described herein may be usable by non-autonomous vehicles as well.

The autonomous vehicle 102 of FIG. 1 may be a bidirectional vehicle. As used herein, a bidirectional vehicle is one that is configured to switch between traveling in a first direction of the vehicle and a second, opposite, direction of the vehicle. In other words, there is no fixed "front" or "rear" of the vehicle 102. Rather, whichever longitudinal end of the vehicle 102 is leading at the time becomes the "front" and the trailing longitudinal end becomes the "rear." Details of the bidirectional operation of an autonomous vehicle may be found in U.S. patent application Ser. No. 15/674,688, now issued as U.S. Pat. No. 10,737,737, which is incorporated herein by reference in its entirety. As illustrated, the autonomous vehicle 102 generally extends longitudinally between a first end 104 and a second end 106. Depending on the motion direction, the first end 104 and the second end 106 of the autonomous vehicle can be either a leading end or a trailing end. As illustrated in FIG. 1, when the autonomous vehicle 102 travels in a motion direction X, the first end 104 is the leading end of the autonomous vehicle 102 and the second end 106 is the trailing end. However, when the vehicle travels in a direction opposite the motion direction X, the first end 104 is the trailing end and the second end 106 is the leading end. As also shown in FIG. 1, and to facilitate similar outcomes when travelling in either of the directions, the autonomous vehicle 102 is symmetrical about a lateral plane 107, e.g., the first end 104 may be substantially identical in size, shape, composition, or the like, to the second end 106.

To facilitate this bi-directionality, the autonomous vehicle includes a first drive module 108A proximate the first end 104, e.g., for controlling wheels 110 proximate the first end 104, and a second drive module 108B proximate the second end 106, e.g., for controlling the wheels 110 proximate the second end 106. As shown in FIG. 1, the first drive module 108A may have associated therewith, or may include, a first thermal system 112A, including, among other features, a first radiator 114A and a first fan 116A. Similarly, the second drive module 108B may have associated therewith, or may include, a second thermal system 112B, including, among other features, a second radiator 114B and a second fan 116B. The first thermal system 112A, including the first radiator 114A and the first fan 116A, dissipates heat generated at the first end 104 of the vehicle 102, e.g., by aspects of the first drive module 108A. The second thermal system 112B, including the second radiator 114B and the second fan 116B, dissipates heat generated at the second end 106 of the vehicle 102, e.g., by aspects of the second drive module 108B. Although not shown, openings may be provided at the first end 114 and the second end 116 of the autonomous vehicle 102 to facilitate ambient air contacting the radiators 114A, 114B. Although not detailed in FIG. 1, the drive modules 108, may include one or more of propulsion system components, power system components, steering system components, braking system components, suspension system components, drive system components, heating, ventilation and air conditioning (HVAC) system components, electrical system components, computing system components, and/or other systems/system components.

In implementations of this disclosure, the first thermal system 112A may be a dedicated system for cooling the first end 104 of the vehicle 102, and the second thermal system 112B may be a dedicated system for cooling the second end 106 of the vehicle. In examples, the thermal systems 112 may be substantially identical. For instance, the thermal systems 112 may be modular systems, and/or may be portions of larger modular systems, e.g., modular systems used at each end of the vehicle 102. In some examples, because the vehicle 102 is intended for bidirectional travel, the modularity may result in a design that is not optimized for travel in a single, predetermined direction, e.g., as in conventional unidirectional vehicles. Stated differently, because systems, including the thermal systems 112, are intended to operate with the vehicle 102 travelling in either of two opposite directions, the design of those systems may not be optimized for travel in either direction, and, in some instances, may actually exacerbate some cooling functions.

As the vehicle 102 can operate in a bi-directional mode, during motion of the vehicle 102, the first radiator 114A and/or the first fan 116A experience different conditions than the second radiator 114B and the second fan 116B. In the example of FIG. 1, e.g., in which the autonomous vehicle 102 is travelling in the motion direction X, the first end 114 is the leading end and the second end 116 is the trailing end. As a result, the first radiator 114A and/or the first fan 116A are directly exposed to airflow (represented by arrows 118) resulting from movement of the autonomous vehicle 102 in the motion direction X. However, the second radiator 114B and/or the second fan 116B are not exposed to direct airflow. Instead, the second radiator 114B and the second fan 116B are disposed in the wake region, with airflow generally shown by the arrows 120, although the illustrated airflow is not limiting. In other examples, the second fan 116B can be controlled in an opposite rotational direction, e.g., to cause airflow in the direction opposite the arrows 120. While some ambient air may enter the autonomous vehicle 102 proximate the second radiator 114B, the second fan 116B will generally have to pull air in a direction opposite to the motion direction X. As will be appreciated, because of the impact of this ambient airflow, heat may be exchanged more efficiently at the first end 104, e.g., by the first thermal system 112A than at the second end 106, e.g., by the second thermal system 112B. Stated differently, the thermal system at the leading end may have a better coefficient of performance (COP) than the thermal system at the trailing end. As will be appreciated, this effect is the opposite when the autonomous vehicle 102 travels in the direction opposite the motion direction, e.g., the second end 106 is the leading end. More specifically, in this opposite direction of travel, the second radiator 114B receives higher and more direct airflow than the first radiator 114A, causing the first fan 106A to pull additional air, resulting in a lower efficiency. Although aerodynamic features of a vehicle to direct air onto a (rear-mounted) radiator may be optimized to direct air to a radiator, in the case of a bidirectional vehicle, such features may be detrimental for operation of the vehicle in the opposite direction. In other words, the improvements to airflow for a rear radiator may be detrimental when the vehicle switches directions and the rear radiator becomes the front radiator.

As discussed above, the thermal systems 112 act to dissipate heat generated by components at the respective ends of the vehicles. For example, the autonomous vehicle 102 can include one or more heat generating components, including but not limited to one or more batteries 122, a motor 124, an HVAC (heating, ventilation, and air conditioning) system 126, and/or one or more computing systems 128, each generating heat and/or otherwise requiring heat exchange. As shown in FIG. 1, and in examples of this disclosure, each end of the vehicle 102 may have one or more instances of the batteries 122, the motor 124, the HVAC system 126, and/or the computing systems 128. Although shown separately in FIG. 1, one or more of the heat generating components can be incorporated into, coupled to, or otherwise associated with the drive modules 108A, 108B. In some examples, the heat generating components associated with the first end 104 may be substantially the same as or identical to the heat generating components associated with the second end 106. For instance, and as noted above, the vehicle 102 may be substantially symmetrical about the symmetry plane 107.

In operation, because of the ambient airflow just described, heat exchange is more efficient at the leading end of the autonomous vehicle 102 and less efficient at the trailing end of the autonomous vehicle 102. In some conditions, e.g., high ambient or environment temperatures, heat exchange may be inadequate at the trailing end of the autonomous vehicle to effectively dissipate heat generated by the components in that end. Such inadequacies can result in inefficient functioning of the components, which may lead to passenger discomfort (e.g., resulting from inefficient cooling via the HVAC system 126) and/or component wear and/or failure (e.g., from overheating).

Aspects of this disclosure relate to improving the heat rejection capacity of the entire thermal system, e.g., both the first thermal system 112A and the second thermal system 112B, of the autonomous vehicle 102. Specifically, and as shown in FIG. 1, the autonomous vehicle 102 also includes a thermal management system 130 associated with the first thermal system 112A and the second thermal system 112B. More specifically, the thermal management system 130 includes functionality, subsystems, and/or components to couple and communicate between the first thermal system 112A and the second thermal system 112B to balance the heat load between the opposing ends 104, 106 of the autonomous vehicle 102. For example, continuing the example of FIG. 1 in which the vehicle 102 is travelling in the motion direction X, the thermal management system 130 can transfer heat load from the trailing end, e.g., from the second thermal system 112B, to the leading end, e.g., to the first thermal system 112A, for heat load balancing. For example, rather than the first thermal system 112A dissipating only the heat load generated by components proximate the first end 104 of the vehicle 102 and the second thermal system 112B dissipating only the heat load generated by the components proximate the second end 104 of the vehicle 102, the thermal management system 130 facilitates coupling of and cooperation between the first thermal system 112A and the second thermal system 112B. In practice, instead of splitting the heat load 50%-50% between the thermal systems 112 on the leading end and the trailing end, the thermal management system 130 can configure the first thermal system 112A of the leading end to carry more of the heat load, e.g., 60%, while the thermal system 112B of the trailing end carries less of the heat load, e.g., 40%. To achieve this, in aspects of this disclosure, the thermal management system 130 can facilitate coupling and/or in fluid communication between the first thermal system 112A and the second thermal system 112B, e.g., to exchange the thermal energy from the trailing end to the leading end.

As discussed herein, the vehicle 102 describe herein can be assembled to have two drive modules (i.e., first drive module 108A and second drive module 108B) symmetrically deployed on the two ends of the vehicle. This allows efficient manufacturability and provides redundancy of the various systems deployed thereon. Details of the vehicle modular assembly may be found in U.S. patent application Ser. No. 15/674,688 now issued as U.S. Pat. No. 10,737,737, the entirety of which is hereby incorporated herein by reference for all purposes.

Figure 2:
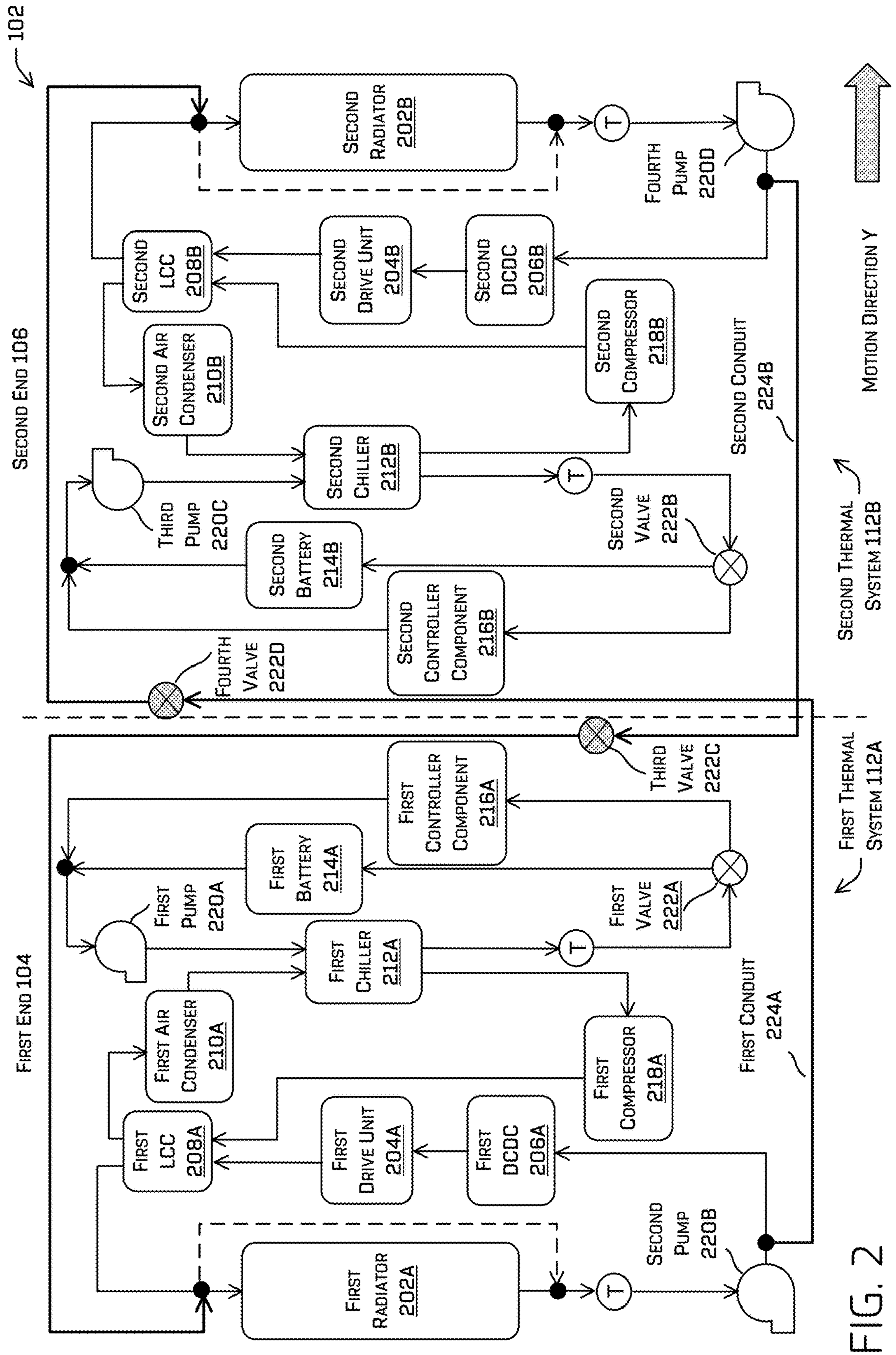
FIG. 2 illustrates a block diagram of portions of the autonomous vehicle 102, to demonstrate examples of heat load balancing techniques utilizing high temperature coolant loops, in accordance with examples of the disclosure.

FIG. 2 illustrates a block diagram of portions of the autonomous vehicle 102, to demonstrate examples of heat load balancing techniques utilizing high temperature coolant loops, in accordance with examples of the disclosure. Without limitation, aspects of FIG. 2 may be an implementation of the thermal management system 130.

The example illustrated in FIG. 2 shows that the autonomous vehicle is moving in a motion direction Y, and thus, the second end 106 becomes the leading end and the first end 104 becomes the trailing end. As discussed above, various vehicle components generate heat while the vehicle is in motion. FIG. 2 shows portions of the first thermal system 112A associated with the first end 104 and of the second thermal system 112B. As illustrated, the thermal systems of the autonomous vehicle circulate coolant in multiple coolant loops coupled to and/or fluidly communicated with the vehicle components to avoid overheating. While the coolant flow passes various vehicle components, excessive thermal energy generated thereby is transferred to the coolant and ultimately dissipated to the exterior of the vehicle. Due to uneven airflow received at the radiators located at the leading end and the trailing end of the autonomous vehicle, as detailed above, more heat gets dispelled from the leading end than from the trailing end and/or the leading end is more efficient at dissipating heat. As result, in some instances, the coolant temperature in the leading end thermal system, e.g., the second thermal system 112B in FIG. 2, is lower than the coolant temperature in the trailing end thermal system, e.g., the first thermal system 112A in FIG. 2.

As illustrated in FIG. 2, the thermal system elements are symmetrically deployed on both ends of the autonomous vehicle. In some examples, the thermal system on the first end of the autonomous vehicle may include a first radiator 202A (e.g., the first radiator 114A), a first drive unit 204A, a first DC/DC converter 206A, a first liquid cooling condenser (LCC) 208A, a first air condenser 210A, a first chiller 212A, a first battery 214A, a first controller component 216A, a first compressor 218A, a first pump 220A, and a second pump 220B.

In some examples, in a first coolant loop (also referred to as a low temperature coolant loop), the first pump 220A operates to pump the coolant to flow through the first chiller 212A, the first battery 214A, and the first controller component 216A. The thermal energy generated by the first battery 214A and the first controller component 216A is picked up by the coolant. In some examples, a first valve 222A is placed in the first coolant loop to control the volume and/or speed of the coolant that flows through the first battery 214A and the first controller component 216A.

In some examples, when the coolant passes through the first chiller 212A, some heat carried by the coolant gets transferred to a second coolant loop. In FIG. 2, the second coolant loop flows through the first chiller 212A, the first compressor 218A, the first LCC 208A, and the first air condenser 210A. As should be understood, an evaporator may be used instead of or in conjunction with an LLC (e.g., in parallel with the LLC). The coolant (as used herein, coolant can refer to a refrigerant used with the described phase change loop) flowing out of the first compressor 218A gets cooled by the first LCC 208A and the first air condenser 210A. When the coolant in the second coolant loop passes through the first LCC 208A, some heat is transferred to a third coolant loop to be expelled out of the autonomous vehicle.

In some examples, in the third coolant loop (also referred to as a high temperature coolant loop), a second pump 220B pumps the coolant to flow through the first DC/DC converter 206A, the first drive unit 204A, the first LCC 208A, and the first radiator 202A. In some examples, the coolant flowing in the third coolant loop may also carry the thermal energy generated by the first DC/DC converter 206A and the first drive unit 204A. When the coolant passes through the first radiator 202A, the heat carried by the coolant gets exchanged to the ambient air outside the autonomous vehicle.

The second thermal system 112B on the second end of the autonomous vehicle includes similar, or the same, elements as the first thermal system 112A. For example, and as discussed above, the second end 106, and the components associated therewith, may be the same. As shown in FIG. 2, the second thermal system 112B includes a second radiator 202B, a second drive unit 204B, a second DC/DC converter 206B, a second liquid cooling condenser (LCC) 208B, a second air condenser 210B, a second chiller 212B, a second battery 214B, a second controller component 216B, a second compressor 218B, a third pump 220C, and a fourth pump 220D. Likewise, the thermal system on the second end of the autonomous vehicle also includes three coolant loops. In the first coolant loop (e.g., a low temperature coolant loop), the third pump 220C pumps the coolant to flow through the second battery 214B and the second controller component 216B to pick up the thermal energy generated thereby. In some examples, a second valve 222B is placed in the first coolant loop to control the volume and/or speed of the coolant that flows through the second battery 214B and the second controller component 216B. At the second chiller 212B, the thermal energy carried by the coolant is exchanged to the second coolant loop, where the coolant flows through the second compressor 218B, the second LCC 208B, and the second air condenser 210B. The second LCC 208B and the second air condenser 210B further cool the hot air outputted from the second compressor 218B. When the coolant passes through the second LCC 208B, the heat is further exchanged to the third coolant loop (e.g., a high temperature coolant loop), where the coolant flows through the fourth pump 220D, the second DC/DC converter 206B, the second drive unit 204B, and the second radiator 202B. As will be appreciated from the foregoing, the thermal energy generated by the internal components of the autonomous vehicle are dissipated outside the autonomous vehicle.

In this example, the first and second controller components 216A, 216B may be any computing systems disposed on the vehicle 102. Moreover, although two controller components 216A, 216B are shown, in some examples the vehicle 102 may include only a single controller component, e.g., for controlling aspects at both ends of the vehicle. In this example, the single controller component may be disposed between the ends of the vehicle 102, and heat generated by the single controller component can be transferred by either or both of the thermal systems 112A, 112B.

Various components of the autonomous vehicle contribute to the heat inside the cabin including but not limited to propulsion systems, computing components, energy storage systems, sensor systems, emitters, networking components, batteries, pumps, compressor, etc. As described above, when the vehicle is in motion, the leading end radiator (i.e., the radiator at the end oriented in the direction of travel) receives higher airflow than the trailing end radiator (i.e., the radiator at the end opposite the direction of travel). Thus, when the vehicle travels in the motion direction Y, as illustrated in FIG. 2, the coolant temperature in the thermal system of the first end 104 (i.e., the trailing end) is higher than in the second end 106 (i.e., the leading end), e.g., because of the abundance of airflow over the second radiator 202B and/or other components of the second thermal system 112B and the death of airflow over the first radiator 202A and/or other components of the first thermal system 112A.

In some examples, to balance the heat load between the first end 104 and the second end 106 of the autonomous vehicle, the third coolant loops (e.g., the high temperature coolant loops) in the first end and the second end of the autonomous vehicle are coupled together and/or fluidly communicated with each other to exchange the thermal energy carried therein. In some other examples, the first coolant loops (e.g., the low temperature coolant loops) in the first end and the second end of the autonomous vehicle are coupled together and/or fluidly communicated with each other to exchange the thermal energy carried therein. In yet other examples, the heat load balancing may be achieved by utilizing a combination of the low temperature coolant loop and the high temperature coolant loop. Examples of these couplings are detailed herein. In some examples, the cooling loop can be referred to as a phase change loop, where the cooling process involves changing the state of the thermally conductive medium between liquid and gas. In examples, coupling two coolant loops prior to a compressor component (e.g., of a phase change loop) can lead to increasing efficiencies as opposed to coupling loops after the compressor. In some examples, a non-phase change loops may be coupled prior to a phase change loop or phase change loops can be coupled together.

In the example of FIG. 2, a first conduit 224A connects the output of the second pump 220B in the high temperature coolant loop of the first end to the input of the second radiator 202B in the high temperature coolant loop of the second end of the autonomous vehicle. Further, a second conduit 224B connects the output of the fourth pump 220D in the high temperature coolant loop of the second end to the input of the first radiator 202A in the high temperature coolant loop of first end of the autonomous vehicle. A third valve 222C and a fourth valve 222D may be respectively positioned in the first conduit 224A and the second conduit 224B to control the flow of coolant, and therefore the amount of heat, transferred between the first end and the second end. In some examples, the first conduit 224A and the second conduit 224B may be hoses, metal conduits, flexible metal conduits, or the like.

In the example illustrated in FIG. 2, the autonomous vehicle is travelling in the motion direction Y, thus, the second end becomes the leading end and the first end becomes the trailing end. As the vehicle travels, the coolant temperatures at the outlets of the first radiator 202A in the trailing end and the second radiator 202B in the leading end are measured, e.g., by in-line temperature sensors. As the leading end is exposed to higher airflow than the trailing end, the coolant temperature at the outlet of the second radiator 202B is generally lower than the coolant temperature at the outlet of the first radiator 202A when the first thermal system 112A dissipates heat from the first end 104 and the second thermal system 112B dissipates heat from the second end 106.

Figure 11:
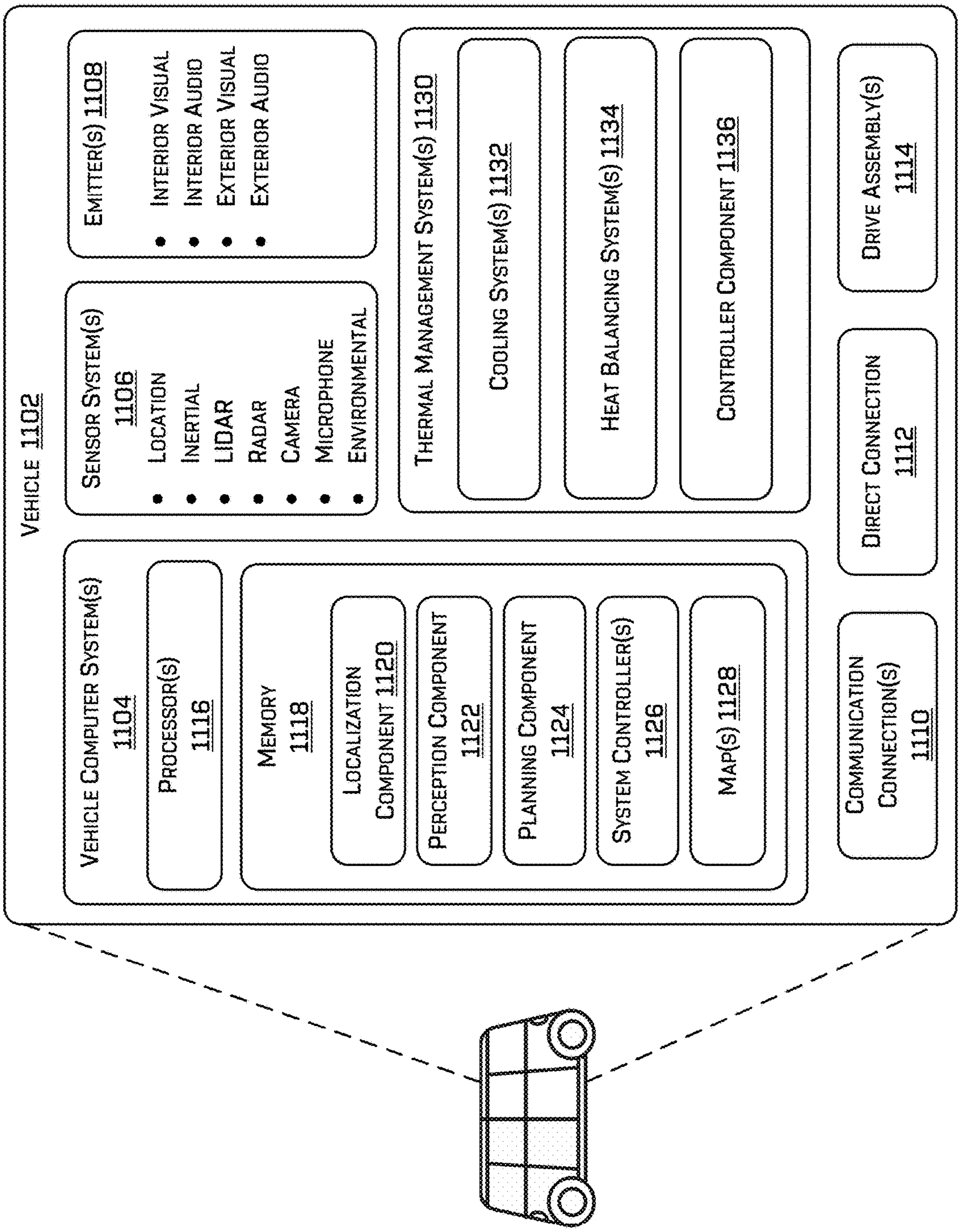
FIG. 11 is a block diagram of an example system for implementing the techniques described herein.

In examples of this disclosure, the temperature data is transmitted to a controller component of the autonomous vehicle (e.g., a controller associated with the thermal management system 130 and/or a controller component shown in FIG. 11). When the coolant temperature difference at the outlets of the first radiator 202A and the second radiator 202B is greater than a first threshold, the controller component can operate the third valve 222C and the fourth valve 222D to allow coolant from the first thermal system to flow to the second thermal system and coolant from the second thermal system to flow to the first thermal system, resulting in thermal energy being transferred from the trailing end to the leading end. In some examples, the first threshold may be set as 3° C. The third valve 222C and the fourth valve 222D may be 2-port valves or one-way valves. In one non-limiting example, when the coolant outlet temperature at the trailing end is 3° C. higher than the outlet coolant temperature at the leading end, the third valve 222C and the fourth valve 222D may be operated to allow 3 lpm coolant flow from the leading end to the trailing end through the first conduit 224A and the second conduit 224B. As the coolant temperature in the leading end is lower than the coolant temperature in the trailing end, the thermal energy carried therein gets exchanged, thus, cooling down the coolant temperature in the trailing end. When the coolant outlet temperature difference between the trailing end and the leading end is no greater than the first threshold, the third valve 222C and the fourth valve 222D are closed, e.g., such that the first thermal system 112A and the second thermal system 112B operate independently.

In some examples, the thermal management system 130 or some other controller component of the autonomous vehicle may also analyze the speed data of the vehicle to determine modifications to the thermal systems 112A, 112B. For example, when the vehicle is not in motion or is travelling at a relatively low speed, it may not be necessary to operate the third valve 222C and the fourth valve 222D to exchange heat between the two ends of the vehicle. For example, when the vehicle is parking, driving around a parking lot, or driving in a community with a relatively low speed limit, etc., the controller component of the autonomous vehicle may determine to keep the third valve 222C and the fourth valve 222D closed. In some implementations, a speed threshold may be preset to determine whether the heat exchange should be triggered. For example, when the speed of the autonomous vehicle is no greater than 30 kph, the controller component of the autonomous vehicle may keep the third valve 222C and the fourth valve 222D closed. However, at speeds above the speed threshold, the third valve 222C and the fourth valve 222D may be operated to exchange coolant (and thus heat) between the first and second thermal systems 112A, 112B, via the first and second conduits 224A, 224B.

It should be understood that the examples and implementations described above are merely for the illustration purpose. The present application is not intended to be limiting. The system may set various thresholds for the coolant outlet temperature difference and the vehicle speed.

FIGS. 3-6 illustrate block diagrams of other example heat load balancing techniques utilizing low temperature coolant loops, in accordance with examples of the disclosure. The examples as illustrated in FIGS. 3-6 show only the low temperature coolant loops in both ends of the autonomous vehicle. In the examples illustrated in FIGS. 3-6, instead of (or in addition to) connecting the high temperature coolant loops in the leading end and the trailing end of the autonomous vehicle, the low temperature coolant loops in the leading end and the trailing end are connected to balance the heat load inside the autonomous vehicle.

Figure 3:
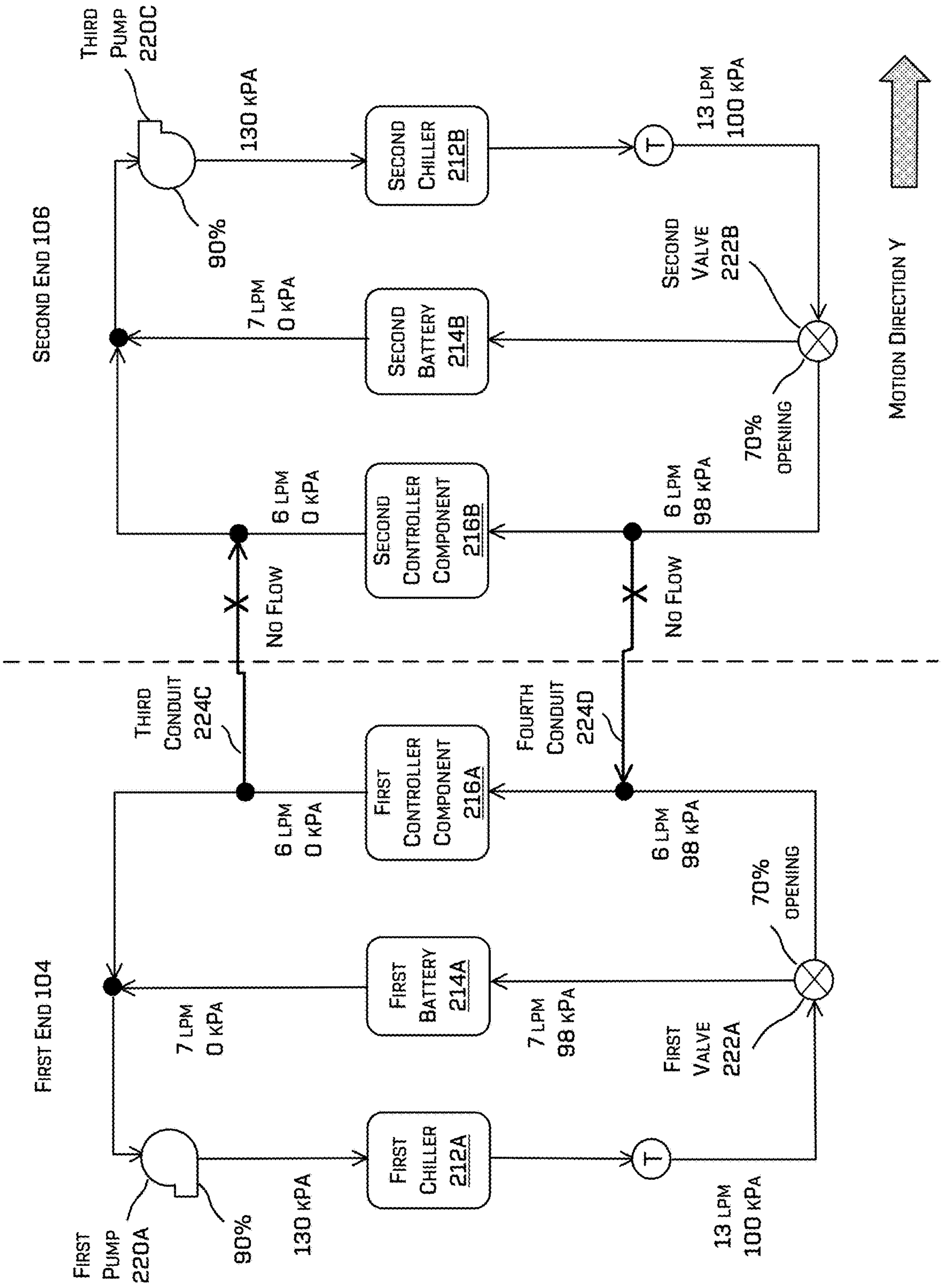
FIG. 3 illustrates a block diagram of a first example heat load balancing techniques utilizing low temperature coolant loops, in accordance with examples of the disclosure.

FIG. 3 illustrates a block diagram of a first example heat load balancing techniques utilizing low temperature coolant loops, in accordance with examples of the disclosure. In the first example, a third conduit 224C and a fourth conduit 224D are coupled with the low temperature coolant loop in the first end and the low temperature coolant loop in the second end. The third conduit 224C is coupled with the output of the first controller component 216A in the first end and the output of the second controller component 216B in the second end. The fourth conduit 224D is coupled with the input of the first controller component 216A in the first end and the input of the second controller component 216B in the second end. The heat load balancing according to the first example may be implemented in a circumstance that the autonomous vehicle is not in motion or in slow motion speed (e.g., 0-30 kph). In such circumstance, the coolant temperatures at the outlets of the chillers (i.e., the first chiller 212A and the second chiller 212B) in the leading end and the trailing end may have no significant difference and thus, do not trigger a heat exchange in between.

In some examples, the amount of coolant flow between the first end and the second end is controlled by configuring one or more components of the low temperature coolant loops on both ends of the vehicle. In some examples, the amount of coolant flow may be controlled by setting the speeds of the first pump 220A in the first end and the third pump 220C in the second end. Alternatively, or additionally, the coolant flow may be controlled by setting the openings of the first valve 222A in the first end and the second valve 222B in the second end.

In some examples, the speeds of the first pump 220A and the third pump 220C and/or the openings of the first valve 222A and the second valve 222B may be determined based on the temperature difference of the coolant at the outlets of the first chiller 212A and the second chiller 212B. In some examples, the speeds of the first pump 220A and the third pump 220C and/or the openings of the first valve 222A and the second valve 222B may be further adjusted according to the speed of the autonomous vehicle.

In the example shown in FIG. 3, the controller component of the vehicle may detect that the vehicle is not in motion or in speed less than 30 kph in the motion direction Y. The heat exchange between the first end and the second end is unnecessary. The first pump 220A and the third pump 220C are set to operate at 90% capacity and the first valve 222A and the second valve 220B are set at 70% opening. Such configuration yields identical pressure and coolant volume in the low temperature coolant loops of the first end and the second end. As there is no pressure difference at both ends of the third conduit 224C and the fourth conduit 224D, there is no coolant flow in the third conduit 224C and the fourth conduit 224D.

Figure 4:
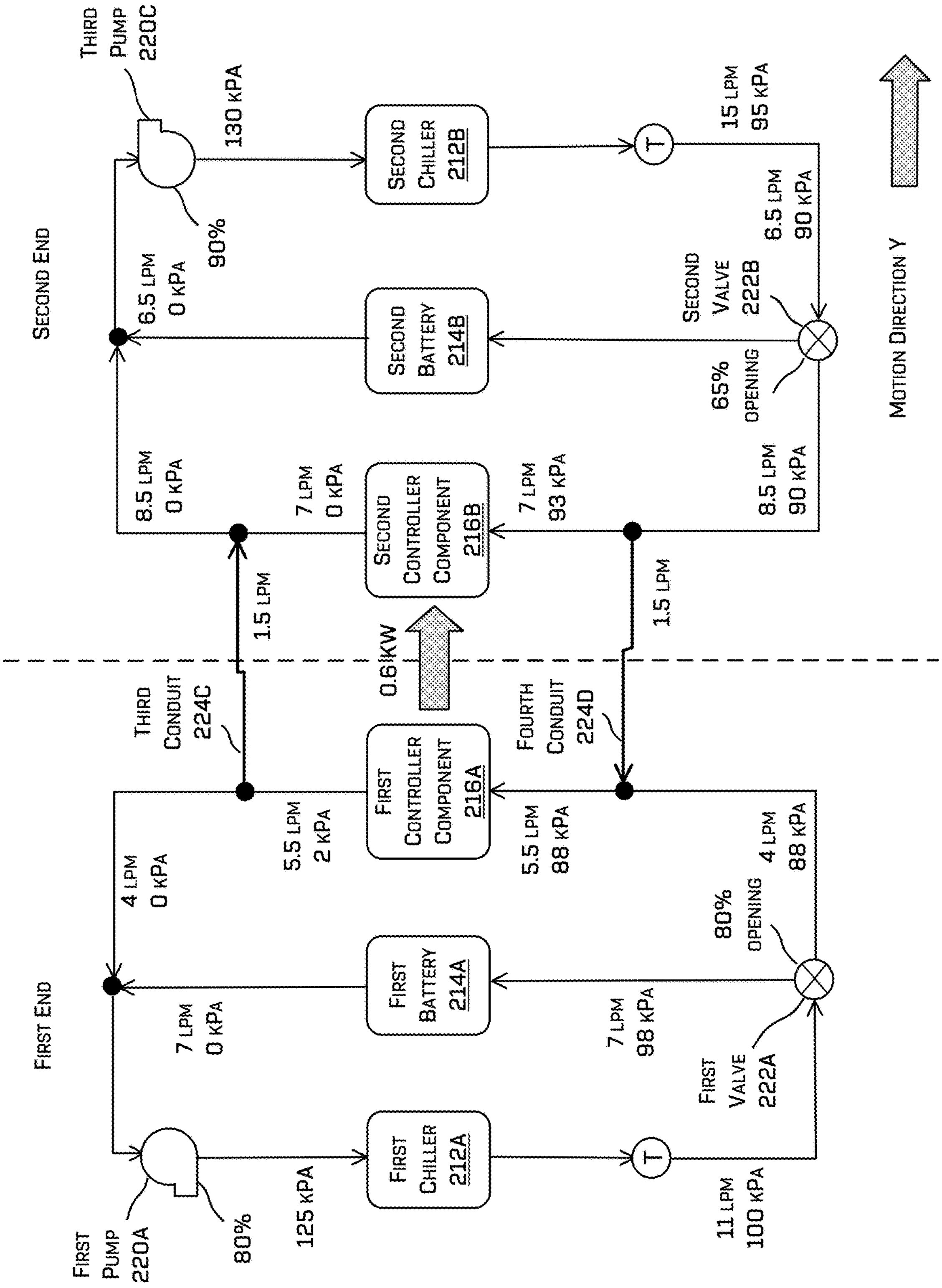
FIG. 4 illustrates a block diagram of a second example heat load balancing techniques utilizing low temperature coolant loops, in accordance with examples of the disclosure.

FIG. 4 illustrates a block diagram of a second example of heat load balancing techniques utilizing low temperature coolant loops, in accordance with examples of the disclosure. The second example heat load balancing techniques may be implemented in a circumstance that the autonomous vehicle is in a speed range, e.g., 30-60 kph, that is relatively higher than the speed range discussed above with the example of FIG. 3. In such circumstance, the coolant temperature difference at the outlets of the chillers (i.e., the first chiller 212A and the second chiller 212B) in the leading end and the trailing end may trigger a first amount of coolant to flow from the leading end to the trailing end.

In some implementations, the controller component of the autonomous vehicle may collect the temperature data associated with the coolant that flows through multiple coolant loops of the vehicle (e.g., the high temperature coolant loop and the low temperature coolant loop). The controller component further measures the difference of the coolant temperatures at the radiator outlets at both ends of the vehicle (i.e., the first radiator 202A in the first end and the second radiator 202B in the second end, as shown in FIG. 2). When the coolant temperature difference at the radiator outlets of the leading end and the trailing end of the vehicle exceeds a first threshold (e.g., 3° C.), the controller component of the vehicle may adjust the openings of the first valve 222A and the second valve 222B until the coolant at the outlet of the first chiller 212A and the second chiller 212B reaches certain temperature levels to help reduce the coolant temperature difference at the radiator outlets. For example, the coolant temperature at the outlet of the leading end may be set as 1° C. lower than the that at the outlet of the trailing end.

In some examples, when the coolant temperature difference at the chiller outlets is still greater than a second threshold (e.g., 0.5° C.) and the coolant temperature difference at the radiator outlets maintains exceeding the first threshold (e.g., 3° C.), the controller component may further adjust the speeds of the pumps at both ends and/or the openings of the valves to allocate the heat load between the leading end and the trailing end. In some examples, the coolant temperature difference at the radiator outlet of the leading end and the trailing end of the vehicle falls in a range of the first threshold (e.g., 3° C.) and the third threshold (e.g., 6° C.). The controller component may set at least one of the speed of the first pump 220A, the speed of the third pump 220C, the opening of the first valve 222A, or the opening of the second valve 222B to generate a pressure differential in the low temperature coolant loops of the first end and the second end, allowing a certain amount of coolant to flow between the leading end and the trailing end. In some examples, instead of coolant, heat can be transferred between loops using a liquid-to-liquid heat exchanger on a low pressure or phase change loop.

In the example illustrated in FIG. 4, the controller component operates the first pump 220A at 80% capacity and the third pump 220C at 90% capacity. The opening of the first valve 222A is set to 80%, which allows 80% of the coolant out of the first chiller 212A to flow through the first battery 214A and 20% of the coolant to flow through the first controller component 216A. The opening of the second valve is set to 65%, which allows 65% of the coolant out of the second chiller 212B to flow through the second battery 214B and 35% of the coolant to flow through the second controller component 216B. Such configuration can generate a 2 kPa pressure differential at the two ends of the fourth conduit 224D, causing 1.5 lpm coolant to flow from the second end to the first end. As the coolant in the first end flows through the first controller component 216A and the coolant in the second end flows through the second controller component 216B, another 2 kPa pressure differential can be generated in the coolant flow at the two ends of the third conduit 224C, causing 1.5 lpm coolant to flow back to the second end. As the coolant in the second end (i.e., the leading end) of the vehicle can be cooler than the coolant in the first end (i.e., the trailing end) of the vehicle, 0.6 KW thermal energy carried in the coolant in the first end can be transferred to the coolant in the second end.

Figure 5:
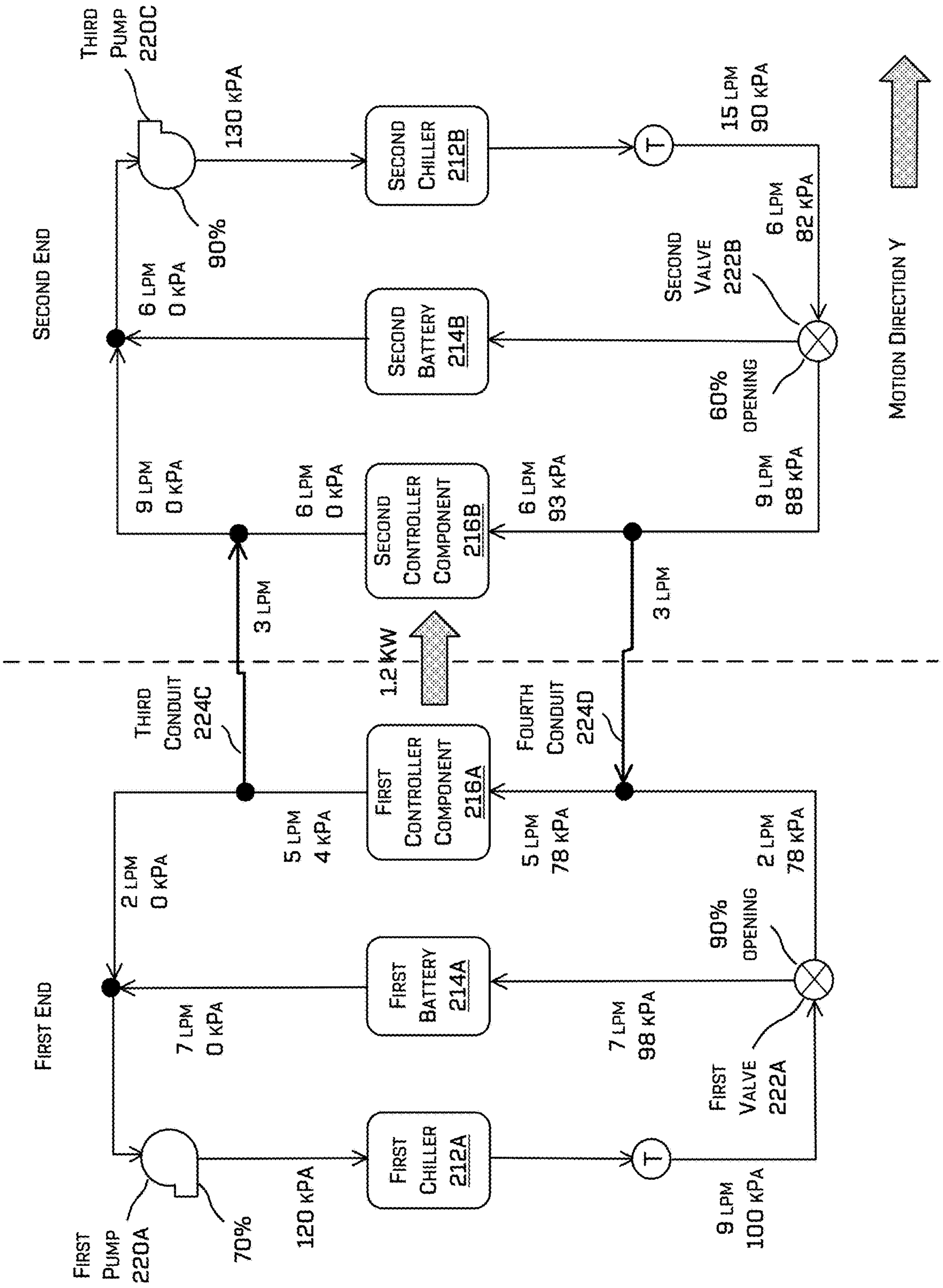
FIG. 5 illustrates a block diagram of a third example heat load balancing techniques utilizing low temperature coolant loops, in accordance with examples of the disclosure.

FIG. 5 illustrates a block diagram of a third example of heat load balancing techniques utilizing low temperature coolant loops, in accordance with examples of the disclosure. The third example heat load balancing techniques may be implemented in a circumstance that the autonomous vehicle is in a speed range, e.g., 60-90 kph. As the motion speed is faster than that in the second example, the coolant temperature difference in the leading end and the trailing may be even greater, thus, triggering more heat exchange.

When the coolant temperature difference at the radiator outlets of the leading end and the trailing end falls in a range of the third threshold (e.g., 6° C.) and a fourth threshold (e.g., 9° C.), the controller component of the vehicle sets at least one of the speed of the first pump 220A, the speed of the third pump 220C, the opening of the first valve 222A, or the opening of the second valve 222B to increase the amount of coolant to flow from the leading end to the trailing end.

As illustrated in FIG. 5, the first pump 220A operates at 70% capacity and the third pump 220C operates at 90% capacity. The first valve 222A is set to allow 90% of the coolant out of the first chiller 212A to flow through the first battery 214A and 10% of the coolant to flow through the first controller component 216A. The second valve 222B is set to allow 60% of the coolant out of the second chiller 212B to flow through the second battery 214A and 40% of the coolant to flow through the second controller component 216A. A 4 kPa pressure differential can be generated at the two ends of the fourth conduit 224D, causing 3 lpm coolant to flow from the second end to the first end. After the coolant flows through the first controller component I 216A and the second controller component 216B, another 4 kPa pressure differential can be generated at the two ends of the third conduit 224C, causing 3 lpm coolant to flow back to the second end and 1.2 KW of thermal energy can be transferred from the first end to the second end.

Figure 6:
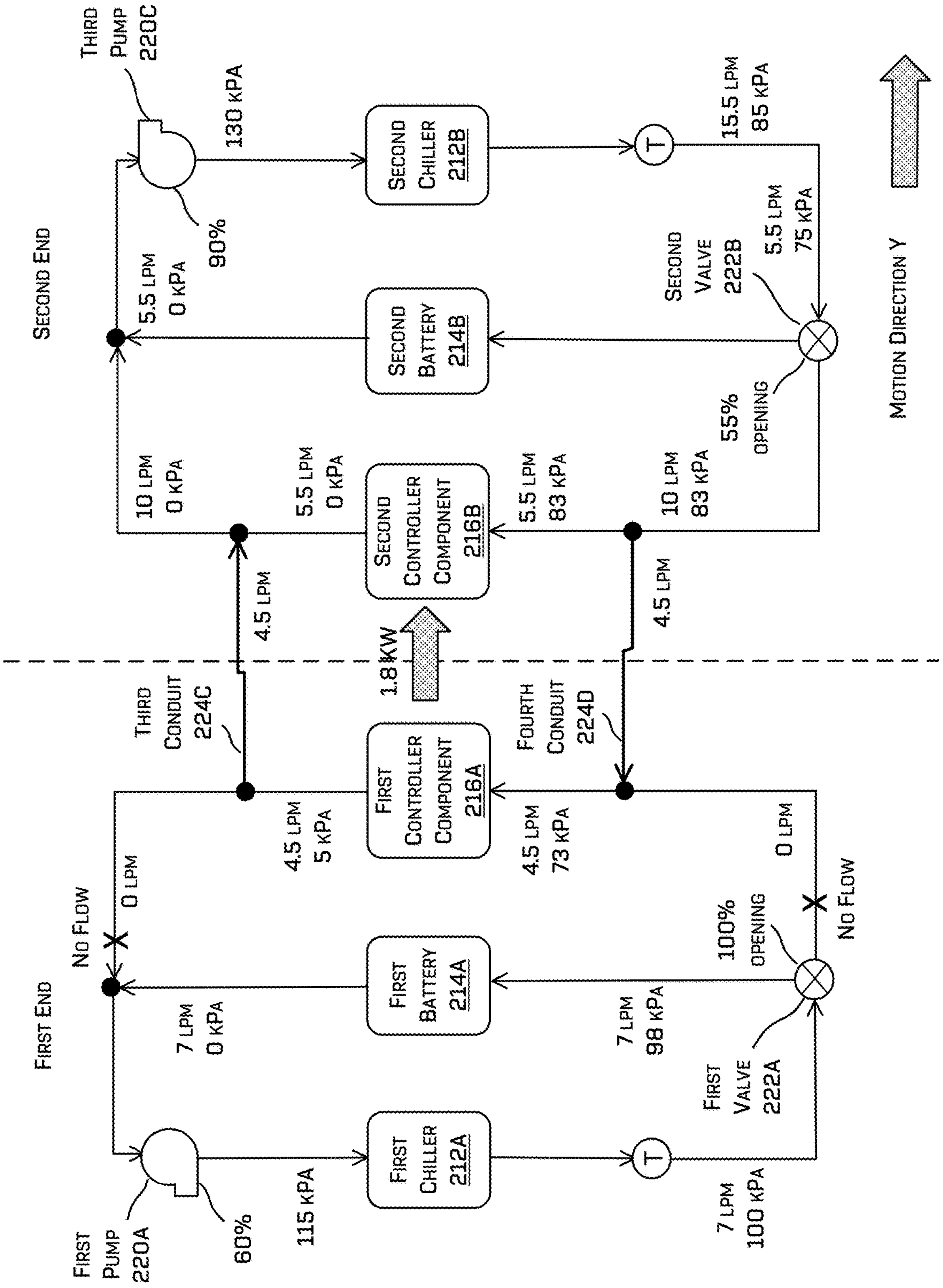
FIG. 6 illustrates a block diagram of a fourth example heat load balancing techniques utilizing low temperature coolant loops, in accordance with examples of the disclosure.

FIG. 6 illustrates a block diagram of a fourth example heat load balancing techniques utilizing low temperature coolant loops, in accordance with examples of the disclosure. The fourth example heat load balancing techniques may be implemented in a circumstance that the autonomous vehicle is in a speed range, e.g., >90 kph. In such circumstance, the autonomous vehicle moves at relatively very high speed, which may cause significant heat load unbalance between the leading end and the trailing end.

When the coolant temperature measures at the radiator outlets of the leading end and the trailing end is greater than the fourth threshold (e.g., 9° C.), the controller component of the vehicle may further adjust at least one of the speed of the first pump 220A, the speed of the third pump 220C, the opening of the first valve 222A, or the opening of the second valve 222B to allow more thermal energy to be transferred from the leading end to the trailing end.

As illustrated in FIG. 6, the first pump 220A operates at 60% capacity and the third pump 220C operates at 90% capacity. The first valve 222A is set to allow the coolant out of the first chiller 212A to fully flow through the first battery 214A and allow no coolant flowing through the first controller component 216A. The second valve 222B is set to allow 55% of the coolant out of the second chiller 212B to flow through the second battery 214A and 45% of the coolant to flow through the second controller component 216A. Such configuration may cause 4.5 lpm coolant to flow through the first controller component 216A, the third conduit 224C, the second end to the first end, and the fourth conduit 224D, and can transfer 1.8 KW thermal energy from the trailing end to the leading end. In this example, the first battery 214A in the low temperature coolant loop of the first end (i.e., the trailing end) may receive complete coolant flow from the first chiller 212A. The thermal energy generated by the first controller component 216A in the low temperature coolant loop of the trailing end is transferred to the low temperature coolant loop of the leading, thus, cooling the temperature of the first controller component 216A.

It should be understood that the examples described in FIGS. 3-6 are merely for illustrative purpose. The present disclosure is not intended to be limiting. The speeds of the pumps (i.e., the first pump 220A and the second pump 220B) and the openings of the valves (i.e., the first valve 222A and the second valve 222B) can be adjusted to achieve a certain amount of coolant flow between the leading end and the trailing end. In addition, the examples described in FIGS. 3-6 merely shows the circumstances that the vehicle moves in the motion direction Y. The autonomous vehicle may move in an opposite direction. The speeds of the pumps and the openings of the valves can be adjusted to allow the coolant to flow from the leading end (i.e., the first end) to the trailing end (i.e., the second end). The conduits coupled to the low temperature coolant loops (i.e., the third conduit 224C and the fourth conduit 224D) also facilitates reverse heat exchange when the vehicle move in an opposite direction. The examples described in FIGS. 3-6 can actively control the speeds of existing pumps and the openings of the existing valves to achieve a certain amount of coolant flow with no need of any additional valves. In addition, when the system has an emergency, the speeds of existing pumps and the openings of the existing valves can be controlled such that there is no pressure differential between the low temperature loops in the leading end and the trailing end, thus, isolating the low temperature loops in the leading end and the trailing end, as illustrated in FIG. 3. Thus, the reliability of the system can be greatly increased.

Figure 7:
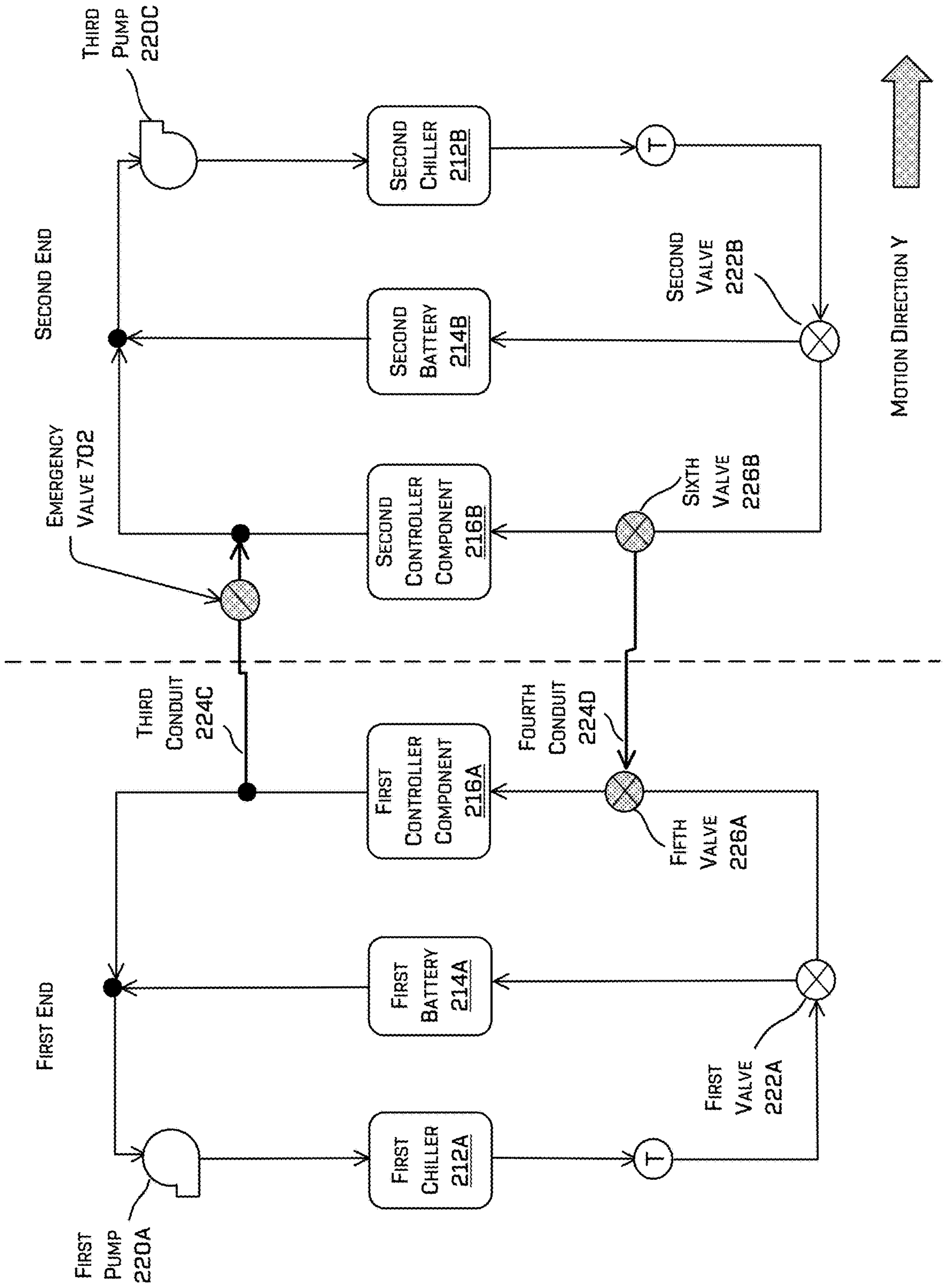
FIG. 7 illustrates a block diagram of another example heat load balancing techniques utilizing low temperature coolant loops, in accordance with examples of the disclosure.

FIG. 7 illustrates a block diagram of another example of heat load balancing techniques utilizing low temperature coolant loops, in accordance with examples of the disclosure. The example as illustrated FIG. 7 also utilizes the low temperature coolant loops in both ends of the autonomous vehicle.

In the illustrated example, in addition to the third conduit 224C and the fourth conduit 224D, a fifth valve 226A may be coupled to the low temperature coolant loop of the first end and a sixth valve 226B may be coupled to the low temperature coolant loop of the second end. The fifth valve 226A and the sixth valve 226B coupled to the fourth conduit 224D. The openings of the fifth valve 226A and the sixth valve 226B may be set to actively control the amount of coolant from the low temperature coolant loop in the leading end to the low temperature coolant loop in the trailing end. The fifth valve 226A and the sixth valve 226B may be 3-way valves to allow the coolant to flow between the first end and the second end in either direction (i.e., the motion direction Y or the opposite direction). In implementations, when the autonomous vehicle moves in the direction opposite to the motion direction Y, as shown, the first end becomes the leading end and the second end becomes the trailing end (as in the example of FIG. 1). The fifth valve 226A and the sixth valve 226B can be controlled to allow the coolant to flow from the first end to the second end of the autonomous vehicle.

The coolant temperatures at the radiator outlets and the chiller outlets are also constantly measured. When the coolant temperature difference at the radiator outlets exceeds certain threshold (e.g., 3° C.), the controller component of the vehicle may actively control the coolant temperatures at the chiller outlets to offset the coolant temperature difference. When the coolant temperature difference at the chiller outlets exceeds certain threshold (e.g., 0.5° C.) and the coolant temperature difference at the radiator outlets stills exceeds certain threshold (e.g., 3° C.), the controller component may further adjust the operations of the pumps and valves on both ends of the vehicle to allow the coolant from the leading end to the trailing end.

For example, when the coolant temperature difference at the radiator outlets falls in a range of 3° C.-6° C., the controller component may set at least one of the speed of the first pump 220A, the speed of the second pump 220B, the opening of first valve 222A, or the opening of the second valve 222B to achieve 1.5 lpm coolant flow cross the third conduit 224C and the fourth conduit 224D. In another example, when the coolant temperature difference at the radiator outlets falls in a range of 6° C.-9° C., the controller component may set at least one of the speed of the first pump 220A, the speed of the second pump 220B, the opening of first valve 222A, or the opening of the second valve 222B to achieve 3 lpm coolant flow cross the third conduit 224C and the fourth conduit 224D. In yet another example, when the coolant temperature difference at the radiator outlets is greater than 9° C., the controller component may set at least one of the speed of the first pump 220A, the speed of the second pump 220B, the opening of first valve 222A, or the opening of the second valve 222B to achieve 4.5 lpm coolant flow cross the third conduit 224C and the fourth conduit 224D.

The example as illustrated FIG. 7 may also include an emergency valve 702 coupled to the third conduit 224C. The emergency valve 702 may be configured to shut down the third conduit 224C in an emergency condition.

Figure 8:
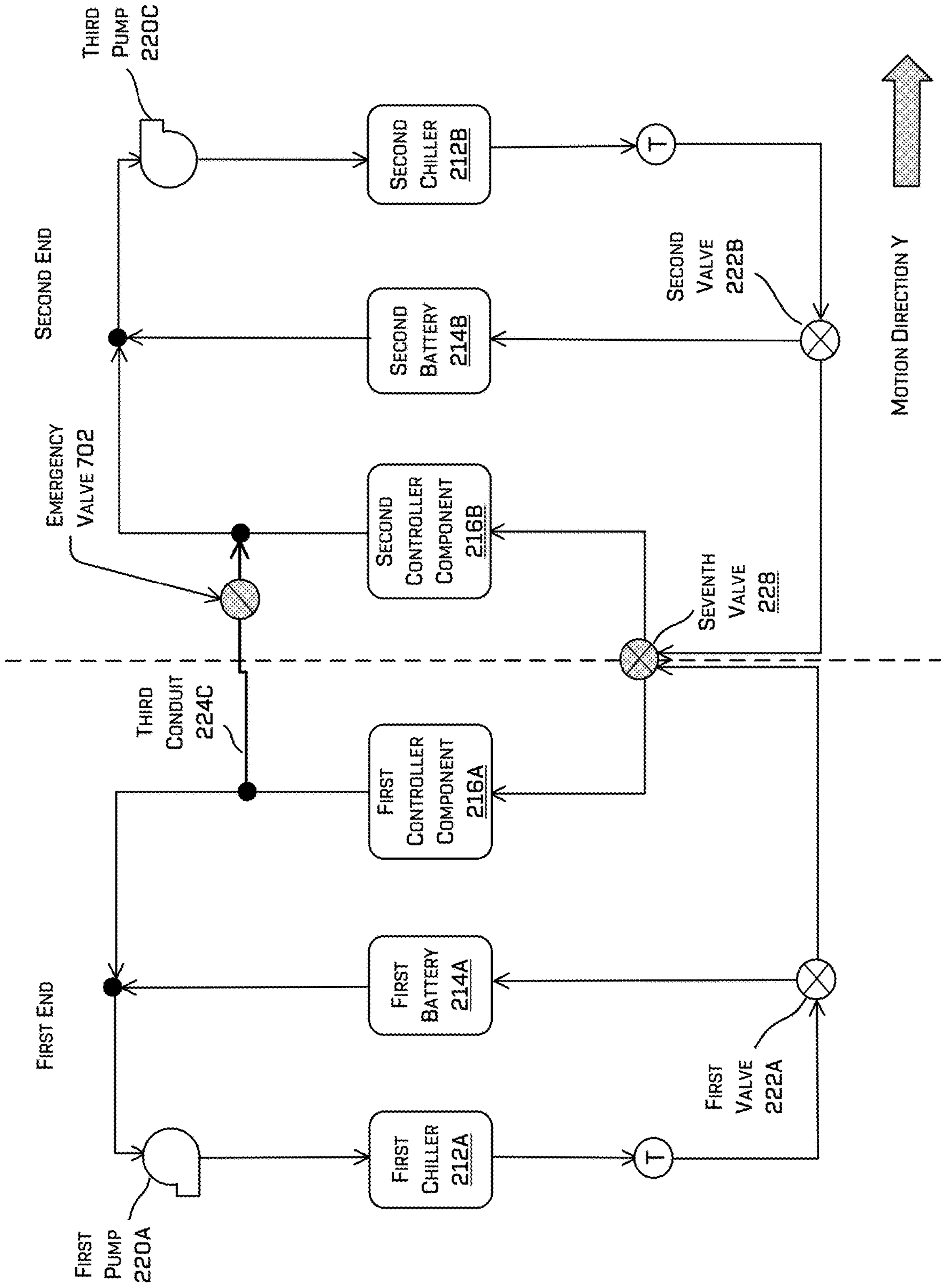
FIG. 8 illustrates a block diagram of another example heat load balancing techniques utilizing low temperature coolant loops, in accordance with examples of the disclosure.

FIG. 8 illustrates a block diagram of another example of heat load balancing techniques utilizing low temperature coolant loops, in accordance with examples of the disclosure.

In the illustrated example, the heat balancing between the first end and the second end of the autonomous vehicle is also achieved by coupling the low temperature coolant loops on both ends. Comparing to the example illustrated in FIG. 7 where two individual valves are coupled to the low temperature coolant loops, the current example uses a single valve (i.e., the seventh valve 228) to connect the low temperature coolant loop of the first end and the low temperature coolant loop of the second end. In some implementations, the seventh valve 228 may be a 4-way valve. Similar to the example shown in FIG. 7, the coolant temperatures at the radiator outlets and the chiller outlets are also constantly measured. When the coolant temperature difference at the radiator outlets exceeds certain threshold (e.g., 3° C.), the controller component of the vehicle may attempt to offset the coolant temperature difference by actively controlling the coolant temperatures at the chiller outlets. The controller component may further adjust the operations of the pumps and valves on both ends of the vehicle to allow more heat exchange from the trailing end to the leading end.

In some examples, when the temperature difference of the coolant at the outlet of the first chiller 212A and the outlet of the second chiller 212B does not trigger the heat exchange between the two ends, the opening of the seventh valve 228 is set to isolate the coolant flows in the low temperature coolant loops of the first end and the second end. In some examples, when the autonomous vehicle moves in one direction (e.g., the motion direction Y shown in FIG. 8) and the coolant temperature difference at the outlets of the radiators triggers the heat exchange between the two ends, the opening of the seventh valve 228 is set to allow a certain amount of coolant to flow from the second end (i.e., the leading end) to the first end (i.e., the trailing end). Likewise, when the autonomous vehicle moves in a direction opposite to the motion direction Y and the temperature difference of the coolant at the outlets of the radiators triggers the heat exchange between the two ends, the opening of the seventh valve 228 is set to allow some coolant to flow from the first end (i.e., the leading end) to the second end (i.e., the trailing end).

In some examples, the controller component of the vehicle may adjust the operation of the seventh valve 228 in conjunction with one or more of the first pump 220A, the second pump 220B, the first valve 222A, or the second valve 222B to achieve a certain amount of coolant flow between the first end and the second end based at least in part on the coolant temperature difference at the radiator outlets, the coolant temperature difference at the chiller outlets, or the speed of the vehicle. Similarly, the example as illustrated FIG. 8 may also include the emergency valve 702 coupled to the third conduit 224C configured to close the third conduit 224C in an emergency condition.

Figure 9:
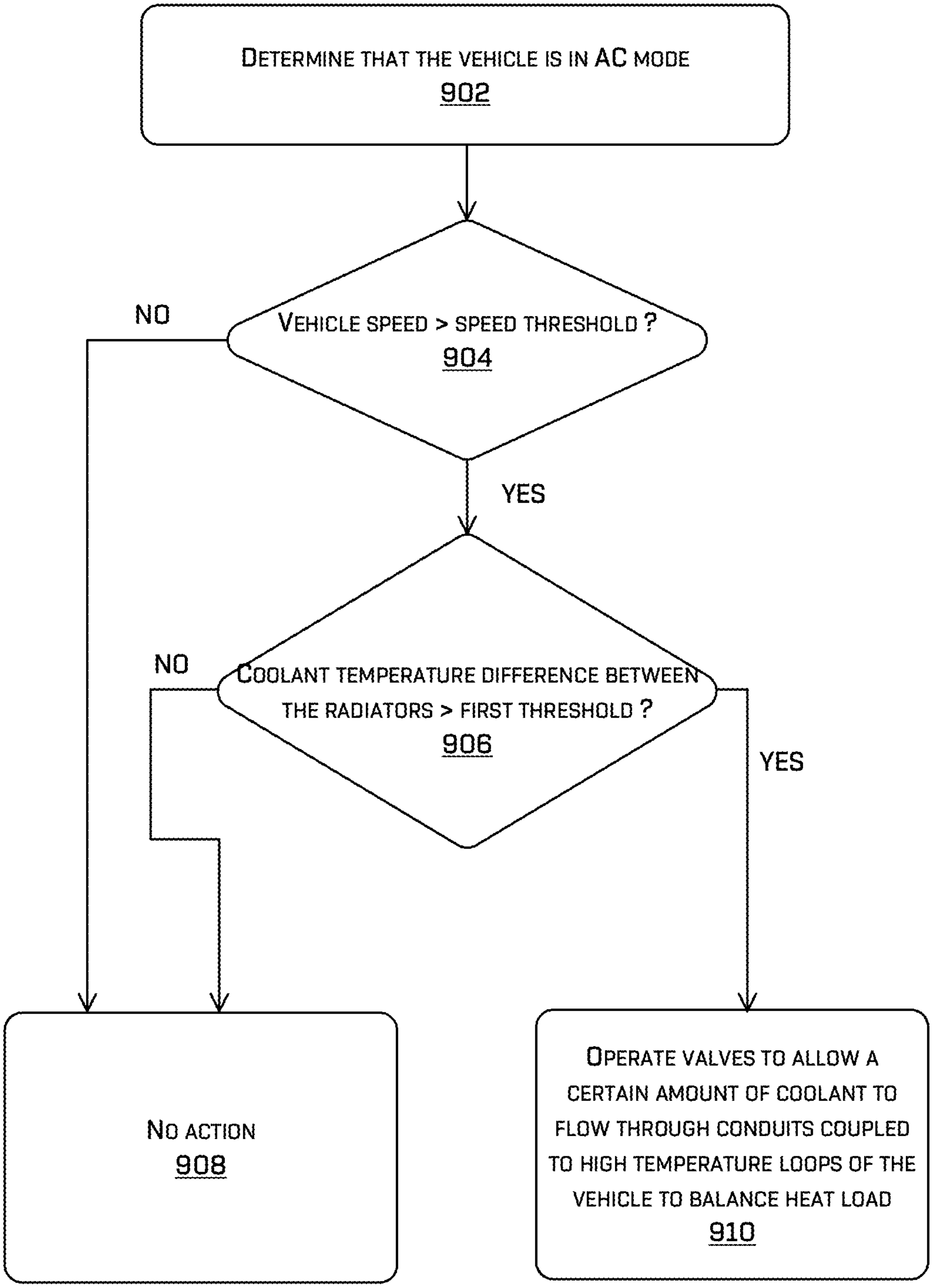
FIG. 9 illustrates a pictorial flow diagram of an example process for heat load balancing utilizing high temperature coolant loops, in accordance with examples of the disclosure.
Figure 10:
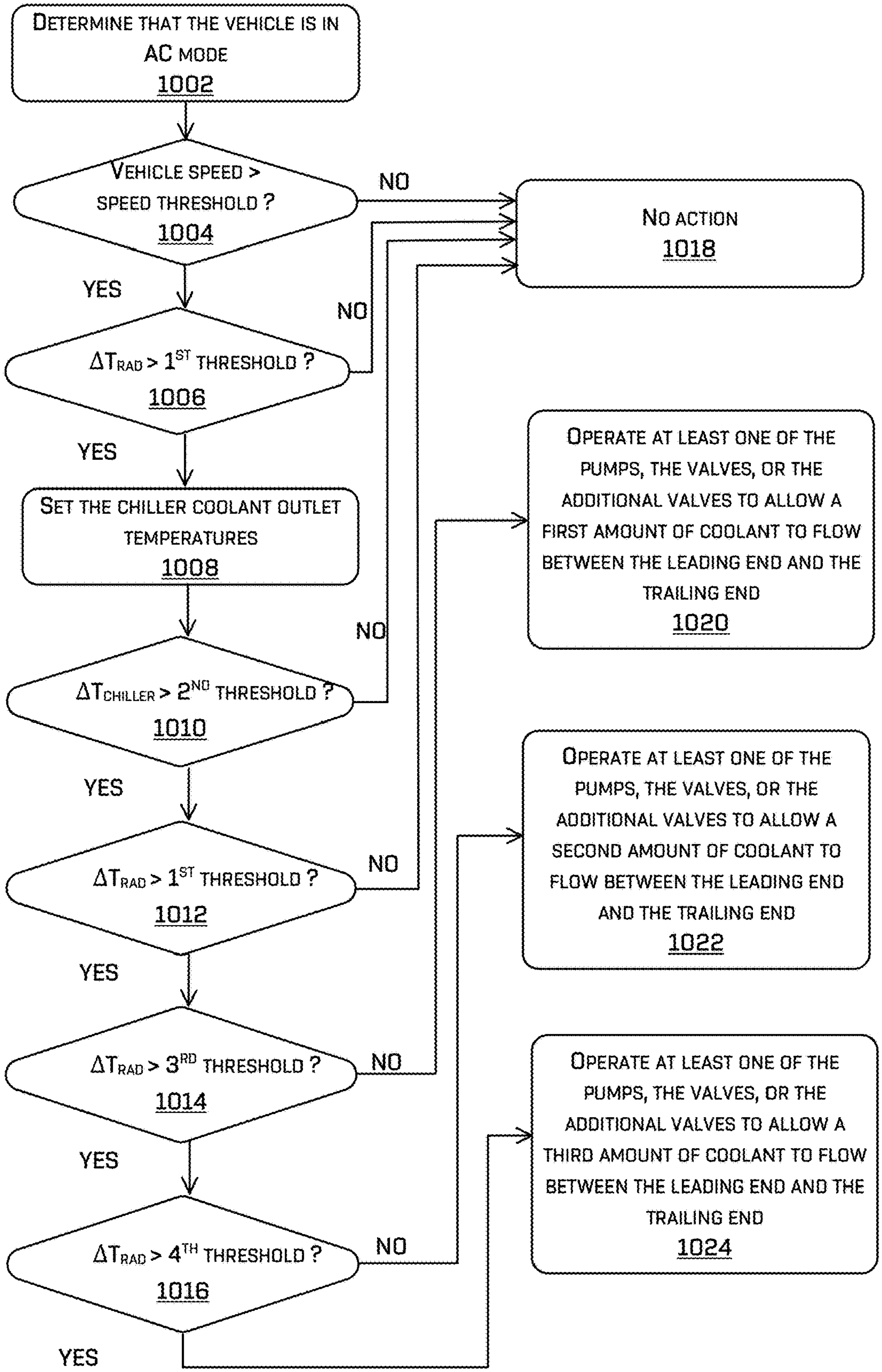
FIG. 10 illustrates a pictorial flow diagram of another example process for heat load balancing utilizing low temperature coolant loops, in accordance with examples of the disclosure.

FIGS. 9-10 illustrate pictorial flow diagrams of example processes for implementing the techniques discussed herein. By way of example and without limitation, the processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined (or omitted) in any order and/or in parallel to implement the processes. In some examples, multiple branches represent alternate implementations that may be used separately or in combination with other operations discussed herein.

FIG. 9 illustrates a pictorial flow diagram of an example process for heat load balancing utilizing high temperature coolant loops, in accordance with examples of the disclosure.

The example process as illustrated in FIG. 9 corresponds to the techniques of utilizing the high temperature coolant loops in the autonomous vehicle as described with respect to FIG. 2. The operations may be performed by a controller component of the autonomous vehicle (e.g., the controller component 1126 in FIG. 11).

At operation 902, the controller component of the autonomous vehicle may determine that the vehicle is in AC mode. If the vehicle is not in AC mode, heat load balancing in the cabin may not be necessary.

At operation 904, the controller component of the autonomous vehicle may determine whether the vehicle speed is greater than a speed threshold. In some implementations, the speed threshold may be set as 30 kph. When the vehicle is not in motion or the motion speed is equal to or less than the speed threshold, the controller component determines that no action is needed (operation 908).

At operation 906, if the vehicle speed is greater than the speed threshold, the controller component of the autonomous vehicle may further determine whether the coolant temperature difference at the radiator outlets is greater than a first threshold. The autonomous vehicle has a variety of sensors to collect data related to the vehicle and the environment. Temperature data is constantly collected to avoid the vehicle components overheating. In some circumstances, the coolant temperature in the thermal systems is collected and analyzed. When the autonomous vehicle travels in one direction, the leading end (i.e., the end orienting the direction of travel) receives more ram air than the trailing end (i.e., the end opposing the direction of travel), causing more thermal energy being dissipated to the ambient air from the leading end. As a result, the coolant temperature in the thermal system of the trailing end may get higher than those in the leading end.

The first threshold is set to determine whether a heat exchange between the leading end and the trailing end should be triggered. In some examples, the first threshold is directed to the coolant temperatures at the outlets of the radiators in the high temperature coolant loops of the vehicle (i.e., the first radiator 202A and the second radiator 202B, as shown in FIG. 2). In some implementations, the first threshold may be set as 3° C. If the coolant temperature difference between the radiators is equal to or less than the first threshold, the controller component determines that no action is needed (operation 908).

At operation 910, if the coolant temperature difference between the radiators is greater than the first threshold, the controller component may operate the valves to allow a certain amount of coolant to flow through the conduits coupled to the high temperature coolant loops of the vehicle to allow the coolant flow from the leading end to the trailing end.

In some examples, the conduits coupled to the high temperature coolant loops of the vehicle may include the first conduit 224A that connects the output of the second pump 220B in the first end with the input of the second radiator 202B in the second end, and the second conduit 224B that connects the output of the fourth pump 220D in the second end and the input of the first radiator 202A in the first end (shown in FIG. 2). By coupling the first conduit 224A and the second conduit 224B to the high temperature coolant loops, the coolant can be controlled to flow from the high temperature coolant loop in the first end (or the second end) to the second end (or the first end). In some examples, each of the first conduit 224A and the second conduit 224B further includes a valve (i.e., the third valve 222C and the fourth valve 222D, shown in FIG. 2) to control the amount of coolant flows from one end to another.

Although the Example of FIG. 9 describes performing operation 902, operation 904, and operation 906 in series, one or more of the operations 902, 904, 906 may be optional. Without limitation, in examples of this disclosure, operation 910 may be performed in response to determining that the coolant temperature difference between the radiators is greater than the first threshold, in operation 906, e.g., without determining that the vehicle is in the AC mode or that the vehicle speed exceeds some threshold speed.

FIG. 10 illustrates a pictorial flow diagram of another example process for heat load balancing utilizing low temperature coolant loops, in accordance with examples of the disclosure.

The example process as illustrated in FIG. 10 corresponds to the techniques of utilizing the low temperature coolant loops in the autonomous vehicle as described with respect to FIGS. 3-8. The operations may be performed by a controller component of the autonomous vehicle (e.g., the controller component 1126 in FIG. 11).

At operation 1002, the controller component of the autonomous vehicle may determine that the vehicle is in AC mode. If the vehicle is not in AC mode, heat load balancing in the cabin may not be necessary.

At operation 1004, the controller component of the autonomous vehicle may determine whether the vehicle speed is greater than a speed threshold. In some implementations, the speed threshold may be set as 30 kph. When the vehicle is not in motion or the motion speed is equal to or less than the speed threshold, the controller component determines that no action is needed (operation 1018).

At operation 1006, if the vehicle speed is greater than the speed threshold, the controller component of the autonomous vehicle may further determine whether $\Delta T_{RAD}$ (i.e., the coolant temperature difference between the radiator outlets) is greater than a first threshold. In some implementations, the first threshold may be set as 3° C. If the coolant temperature difference between the radiators is equal to or less than the first threshold, the controller component determines that no action is needed (operation 1018).

At operation 1008, if $\Delta T_{RAD}$ (i.e., the coolant temperature difference between the radiator outlets) is greater than the first threshold, the controller component of the vehicle may set the chiller coolant outlet temperatures. In some examples, the controller component of the vehicle sets the chiller coolant outlet temperatures to a certain level to offset the temperature difference. For example, the coolant outlet temperature at the leading end chiller may be set as 1° C. lower than the coolant outlet temperature at the trailing end chiller.

At operation 1010, the controller component of the autonomous vehicle may further determine whether $\Delta T_{CHILLER}$ (i.e., the coolant temperature difference between the chiller outlets) is greater than a second threshold. In some implementations, the second threshold may be set as 0.5° C. If the coolant temperature difference between the chiller outlets is equal to or less than the second threshold, the controller component may determine no action is needed (operation 1018).

At operation 1012, if $\Delta T_{CHILLER}$ (i.e., the coolant temperature difference between the chiller outlets) is greater than a second threshold, the controller component of the vehicle determines whether $\Delta T_{RAD}$ exceeds the first threshold. If setting the chiller coolant outlet temperatures to the certain levels helps balance the heat load inside the cabin, $\Delta T_{RAD}$ (i.e., the coolant temperature difference between the radiator outlets) may be below the first threshold. Thus, if $\Delta T_{RAD}$ does not exceed the first threshold, the controller component determines that no action is needed.

At operation 1014, if $\Delta T_{RAD}$ (i.e., the coolant temperature difference between the radiators) exceeds the first threshold, the controller component of the vehicle determines whether $\Delta T_{RAD}$ exceeds a third threshold. In some implementations, the second threshold may be set as 6° C. If $\Delta T_{RAD}$ does not exceed the third threshold (i.e., the coolant temperature difference between the radiator outlets is in a range of 3° C.-6° C.), the controller component of the vehicle performs operation 1020.

At operation 1020, the controller component of the vehicle operates at least one of the pumps, the valves, or the additional valves to allow a first amount of coolant to flow from the leading end to the trailing end. In some implementations, the vehicle may set the pump speeds of the pumps in the low temperature coolant loops of the vehicle (i.e., the first pump 220A and the third pump 220C). In some implementations, the vehicle may further set the openings of the existing valves in the low temperature coolant loops of the vehicle (i.e., the first valve 222A and the second valve 222B). In some implementations, the vehicle may further set the openings of one or more additional valves coupled to the low temperature coolant loops of the vehicle (i.e., the fifth valve 226A and the sixth valve 226B as shown in FIG. 7, or the seventh valve 228 as shown in FIG. 8). The configurations of the pumps and valves are described above with respect to the example shown in FIG. 4, FIG. 7, or FIG. 8. In such circumstance that the coolant temperature difference between the radiator outlets is in a range of 3° C.-6° C., the configuration may yield 1.5 lpm coolant flow between the leading end and the trailing end of the vehicle.

At operation 1016, if $\Delta T_{RAD}$ (i.e., the coolant temperature difference between the radiator outlets) exceeds the third threshold, the controller component of the vehicle further determines whether $\Delta T_{RAD}$ exceeds a fourth threshold. In some implementations, the second threshold may be set as 9° C. If $\Delta T_{RAD}$ does not exceed the fourth threshold (i.e., the coolant temperature difference between the radiator outlets is in a range of 6° C.-9° C.), the controller component of the vehicle performs operation 1022.

At operation 1022, the controller component of the vehicle operates at least one of the pumps, the valves, or the additional valves to allow a second amount of coolant to flow from the leading end to the trailing end. The pumps may include the first pump 220A and the third pump 220C in the low temperature coolant loops, respectively. The valves may include the first valve 222A and the second valve 222B in the low temperature coolant loops, respectively. The additional valves may include one or more of the fifth valve 226A and the sixth valve 226B as shown in FIG. 7, the seventh valve 228 as shown in FIG. 8, or the emergency valve 702 as shown in FIG. 7 and FIG. 8. The configurations of the pumps and valves are described above with respect to the example shown in FIG. 5, FIG. 7, or FIG. 8. In such circumstance that the coolant temperature difference between the radiator outlets is in a range of 6° C.-9° C., the configuration may yield 3 lpm coolant flow between the leading end and the trailing end of the vehicle.

If $\Delta T_{RAD}$ (i.e., the coolant temperature difference between the radiator outlets) exceeds the fourth threshold, the controller component of the vehicle performs operation 1024.

At operation 1024, the controller component of the vehicle operates at least one of the pumps, the valves, or the additional valves to allow a third amount of coolant to flow from the leading end to the trailing end. In such circumstance that the coolant temperature difference is greater than 9° C., the configuration may yield 4.5 lpm coolant flow between the leading end and the trailing end of the vehicle.

FIG. 11 is a block diagram of an example system for implementing the techniques described herein. In some examples, the system may include a vehicle, such as vehicle 1102. The vehicle 1102 may include a vehicle computer system 1114, one or more sensor systems 1116, one or more emitters 1108, one or more communication connections 1110, at least one direct connection 1112, and one or more drive assemblies 1114.

The vehicle computer system 1104 may include one or more processors 1116 and memory 1118 communicatively coupled with the one or more processors 1116. In the illustrated example, the vehicle 1102 is an autonomous vehicle; however, the vehicle 1102 could be any other type of vehicle, such as a semi-autonomous vehicle, or any other system having at least an image capture device (e.g., a camera enabled smartphone). In the illustrated example, the memory 1118 of the vehicle computer system 1104 stores a localization component 1120, a perception component 1122, a planning component 1124, one or more system controllers 1126, and one or more maps 1128. Though depicted in FIG. 11 as residing in the memory 1118 for illustrative purposes, it is contemplated that the localization component 1120, a perception component 1122, a planning component 1124, one or more system controllers 1126, and/or one or more maps 1128.

In some examples, the localization component 1120 may include functionality to receive data from the sensor system(s) 1106 to determine a position and/or orientation of the vehicle 1102 (e.g., one or more of an x-, y-, z-position, roll, pitch, or yaw). For example, the localization component 1120 may include and/or request/receive a map of an environment, such as from map(s) 1128. In some instances, the localization component 1120 may utilize SLAM (simultaneous localization and mapping), CLAMS (calibration, localization and mapping, simultaneously), relative SLAM, bundle adjustment, non-linear least squares optimization, or the like to receive image data, lidar data, radar data, IMU data, GPS data, wheel encoder data, and the like to accurately determine a location of the autonomous vehicle. In some instances, the localization component 1120 may provide data to various components of the vehicle 1102 to determine an initial position of an autonomous vehicle for determining the relevance of an object to the vehicle 1102, as discussed herein.

In some instances, the perception component 1122 may include functionality to perform object detection, segmentation, and/or classification. In some examples, the perception component 1122 may provide processed sensor data that indicates a presence of an object (e.g., entity) that is proximate to the vehicle 1102 and/or a classification of the object as an object type (e.g., car, pedestrian, cyclist, animal, building, tree, road surface, curb, sidewalk, unknown, etc.). In some examples, the perception component 1122 may provide processed sensor data that indicates a presence of a stationary entity that is proximate to the vehicle 1102 and/or a classification of the stationary entity as a type (e.g., building, tree, road surface, curb, sidewalk, unknown, etc.). In additional or alternative examples, the perception component 1122 may provide processed sensor data that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

In general, the planning component 1124 may determine a path for the vehicle 1102 to follow to traverse through an environment. For example, the planning component 1124 may determine various routes and trajectories and various levels of detail. For example, the planning component 1124 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planning component 1124 may generate an instruction for guiding the autonomous vehicle along at least a portion of the route from the first location to the second location. In some examples, the planning component 1124 may determine how to guide the autonomous vehicle from a first waypoint in the sequence of waypoints to a second waypoint in the sequence of waypoints. In some examples, the instruction may be a trajectory, or a portion of a trajectory. In some examples, multiple trajectories may be substantially simultaneously generated (e.g., within technical tolerances) in accordance with a receding horizon technique, wherein one of the multiple trajectories is selected for the vehicle 1102 to navigate.

In some examples, the planning component 1124 may include a prediction component to generate predicted trajectories of objects (e.g., objects) in an environment. For example, a prediction component may generate one or more predicted trajectories for objects within a threshold distance from the vehicle 1102. In some examples, a prediction component may measure a trace of an object and generate a trajectory for the object based on observed and predicted behavior.

In some examples, the vehicle computer system 1104 may include one or more system controllers 1126, which may be configured to control steering, propulsion, braking, safety, emitters, communication, and other systems of the vehicle 1102. The system controller(s) 1126 may communicate with and/or control corresponding systems of the drive assembly(s) 1114 and/or other components of the vehicle 1102.

The memory 1118 may further include one or more maps 1128 that may be used by the vehicle 1102 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 1102 may be controlled based at least in part on the map(s) 1128. That is, the map(s) 1128 may be used in connection with the localization component 1120, the perception component 1122, and/or the planning component 1124 to determine a location of the vehicle 1102, detect objects in an environment, generate routes, determine actions and/or trajectories to navigate within an environment.

The memory 1118 is an example of non-transitory computer-readable media. The memory 1118 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein. In some instances, the memory 1118 may include at least a working memory and a storage memory. For example, the working memory may be a high-speed memory of limited capacity (e.g., cache memory) that is used for storing data to be operated on by the processor(s) 1116. In some instances, the memory 1118 may include a storage memory that may be a lower-speed memory of relatively large capacity that is used for long-term storage of data. In some cases, the processor(s) 1116 cannot operate directly on data that is stored in the storage memory, and data may need to be loaded into a working memory for performing operations based on the data, as discussed herein.

The vehicle 1102 may also include one or more thermal management systems 1130. For example, the thermal management system(s) 1130 can include the first thermal system 112A, the second thermal system 112B, and/or the thermal management system 130 discussed above. As illustrated in FIG. 11, the thermal management system(s) include one or more cooling systems 1132, one or more heat balancing systems 1134, and a controller component 1136. In some examples, the cooling systems 1132 may comprise the condensers (i.e., the first air condenser 210A, the second air condenser 210B, the first LCC 208A, and the second LCC 208B as shown in FIG. 2), the compressors (i.e., the first compressor 218A and the second compressor 218B as shown in FIG. 2), and/or the chillers (i.e., the first chiller 212A and the second chiller 212B). In some examples, the cooling system 1132 is coupled to and/or in fluid communication with the thermal management systems 1130 to cool one or more components of the vehicle 1102. In various examples, the thermal management systems 1130 may be in thermal communication and/or fluid communication with the cooling systems 1132 respectively located on two ends of the vehicle 1102.

In some examples, the heat balancing systems 1134 is coupled to and/or in fluid communication with the thermal management systems 1130 to exchange the thermal energy between the two ends of the vehicle 1102. The heat balancing system 1134 may include various conduits coupled to and/or in fluid communication with the cooling systems 1132 to transfer heat from one end of the vehicle to another such as, the first conduit 224A and the second conduit 224B as shown in FIG. 2, the third conduit 224C and the fourth conduit 224D as shown in FIGS. 3-7. The controller component 1136 may be configured to operate one or more components of the cooling systems 1132 or the heat balancing systems 1134 to balance the heat load inside the vehicle cabin.

As can be understood, the vehicle components discussed herein (e.g., the localization component 1120, the perception component 1122, the planning component 1124, the one or more system controllers 1126, the one or more maps 1128, the cooling systems 1132, the heat balancing systems 1134, the controller component 1136, etc.), are described as divided for illustrative purposes. However, the operations performed by the various components may be combined or performed in any other component of the vehicle computer system 1104.

In some examples, the sensor system(s) 1116 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 1106 may include multiple instances of each of these or other types of sensors. For instance, the lidar sensors may include individual lidar sensors located at the corners, front, back, sides, and/or top of the vehicle 1102. As another example, the camera sensors may include multiple cameras disposed at various locations about the exterior and/or interior of the vehicle 1102. The sensor system(s) 1106 may provide input to the vehicle computer system 1104.

The vehicle 1102 may also include one or more emitters 1108 for emitting light and/or sound. The emitters 1108 may include interior audio and visual emitters to communicate with passengers of the vehicle 1102. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 1108 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 1102 may also include one or more communication connections 1110 that enable communication between the vehicle 1102 and one or more other local or remote computing device(s). For instance, the communication connection(s) 1110 may facilitate communication with other local computing device(s) on the vehicle 1102 and/or the drive assembly(s) 1114. The communications connection(s) 1110 also enable the vehicle 1102 to communicate with a remote teleoperations computing device or other remote services.

The communications connection(s) 1110 may include physical and/or logical interfaces for connecting the vehicle computer system 1114 to another computing device or a network. For example, the communications connection(s) 1110 can enable Wi-Fi-based communication such as via frequencies defined by the IEEE 1402.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In some examples, the vehicle 1102 may include one or more drive assembly(s) 1114. In some examples, the vehicle 1102 may have a single drive assembly 1114. In some examples, if the vehicle 1102 has multiple drive assemblies 1114, individual drive assemblies 1114 may be positioned on opposite ends of the vehicle 1102 (e.g., the front and the rear, etc.). In some examples, the drive assembly(s) 1114 may include one or more sensor systems to detect conditions of the drive assembly(s) 1114 and/or the surroundings of the vehicle 1102. By way of example and not limitation, the sensor system(s) may include one or more wheel encoders (e.g., rotary encoders) to sense rotation of the wheels of the drive assemblies, inertial sensors (e.g., inertial measurement units, accelerometers, gyroscopes, magnetometers, etc.) to measure orientation and acceleration of the drive assembly, cameras or other image sensors, ultrasonic sensors to acoustically detect objects in the surroundings of the drive assembly, lidar sensors, radar sensors, etc. Some sensors, such as the wheel encoders may be unique to the drive assembly(s) 1114. In some cases, the sensor system(s) on the drive assembly(s) 1114 may overlap or supplement corresponding systems of the vehicle 1102 (e.g., sensor system(s) 1116).

The drive assembly(s) 1114 may include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, a heating ventilation and cooling (HVAC) system (e.g., the HVAC system 1144), lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive assembly(s) 1114 may include a drive assembly controller which may receive and preprocess data from the sensor system(s) and to control operation of the various vehicle systems. In some examples, the drive assembly controller may include one or more processors and memory communicatively coupled with the one or more processors. The memory may store one or more modules to perform various functionalities of the drive assembly(s) 1114. Furthermore, the drive assembly(s) 1114 may also include one or more communication connection(s) that enable communication by the respective drive assembly with one or more other local or remote computing device(s).

In some examples, the direct connection 1112 may provide a physical interface to couple the one or more drive assembly(s) 1114 with the body of the vehicle 1102. For example, the direct connection 1112 may allow the transfer of energy, fluids, air, data, etc. between the drive assembly(s) 1114 and the vehicle. In some instances, the direct connection 1112 may further releasably secure the drive assembly(s) 1114 to the body of the vehicle 1102.

Example Clauses

A. A vehicle comprises a first drive motor associated with a first end of the vehicle; a first radiator associated with the first end; a second drive motor associated with a second end of the vehicle, opposed to the first end; a second radiator associated with the second end; a first coolant loop thermally coupled to the first drive motor and the first radiator; a second coolant loop thermally coupled to the second drive motor and the second radiator; a conduit thermally coupling the first coolant loop with the second coolant loop; and a controller configured to control transfer of thermal energy between the first coolant loop and the second coolant loop via the conduit based at least in part on a direction of travel of the vehicle, wherein either the first end or the second end is a leading end for the direction of travel.

B. The vehicle as paragraph A recites, further comprises a first pump associated with the first coolant loop; and a second pump associated with the second coolant loop, wherein the controller is configured to control the first pump or the second pump to transfer the thermal energy between the first coolant loop and the second coolant loop via the conduit.

C. The vehicle as paragraph A recites, further comprises at least one valve associated with at least one of the first coolant loop, the second coolant loop, or the conduit, wherein the controller is configured to actuate, the valve to control the transfer of thermal energy between the first coolant loop and the second coolant loop.

D. The vehicle as paragraph A recites, further comprises a first temperature sensor configured to detect a first temperature associated with the first coolant loop; and a second temperature sensor configured to detect a second temperature associated with the second coolant loop; wherein the controller is configured to control transfer of the thermal energy based at least in part on a difference between the first temperature and the second temperature.

E. The vehicle as paragraph A recites, further comprises a sensor configured to determine a speed of the vehicle, wherein the controller is configured to control transfer of the thermal energy based at least in part on the speed of the vehicle.

F. The vehicle as paragraph C recites, wherein the controller is configured to, based at least in part on detection of a fault in the vehicle, close the valve to isolate the first coolant loop from the second coolant loop.

G. The vehicle as paragraph A recites, wherein the first coolant loop comprises a plurality of first coolant loops, one of which is a first phase change loop, and the second coolant loop comprises a plurality of second coolant loops, one of which is a second phase change loop, wherein the controller is configured to transfer the thermal energy between the first phase change loop and the second phase change loop.

H. A method comprises determining a direction of travel of a vehicle, the vehicle having: a first thermal system including a first coolant loop associated with a first end of the vehicle and a second thermal system including a second coolant loop associated with a second end of the vehicle opposed to the first end; and controlling, based at least in part on the direction of travel, a transfer of fluid between the first coolant loop and the second coolant loop to transfer thermal energy between the first thermal system and the second thermal system.

I. The method as paragraph H recites, further comprises receiving first temperature data associated with a first temperature of the first coolant loop; and receiving second temperature data associated with a second temperature of the second coolant loop, wherein the controlling comprises increasing an amount of the fluid transferred between the first coolant loop and the second coolant loop based at least in part on a difference between the first temperature and the second temperature.

J. The method as paragraph I recites, wherein the first temperature indicates a first coolant outlet temperature of a first radiator disposed at the first end of the vehicle, and the second temperature indicates a second coolant outlet temperature of a second radiator disposed at the second end of the vehicle.

K. The method as paragraph H recites, wherein the controlling further comprises actuating at least one valve to transfer the fluids between the first coolant loop and the second coolant loop, wherein the at least one valve is fluidly coupled to the first coolant loop and the second coolant loop.

L. The method as paragraph K recites, wherein receiving first temperature data associated with a first radiator coupled to the first coolant loop; and receiving second temperature data associated with a second radiator coupled to the second coolant loop, wherein the controlling comprises actuating the at least one valve to transfer the fluid between the first coolant loop and the second coolant loop.

M. The method as paragraph H recites, wherein each of the first coolant loop and the second coolant loop includes a respective pump and a respective valve, and the controlling further comprises operating at least one of the respective pumps or the respective valves to generate a pressure gradient between the first coolant loop and the second coolant loop, causing the transfer of the fluid between the first coolant loop and the second coolant loop.

N. The method as paragraph M recites, wherein the controlling further comprises closing the valves to isolate the first coolant loop from the second coolant loop.

O. A non-transitory computer-readable medium storing instructions that, when executed, cause one or more processors to perform operations comprises determining a direction of travel of a vehicle, the vehicle having a first thermal system including a first coolant loop associated with a first end of the vehicle and a second thermal system including a second coolant loop associated with a second end of the vehicle opposed to the first end; and controlling, based at least in part on the direction of travel, a transfer of fluid between the first coolant loop and the second coolant loop to transfer thermal energy between the first thermal system and the second thermal system.

P. The non-transitory computer-readable medium as paragraph ( ) recites, wherein the operations further comprise receiving first temperature data associated with a first temperature of the first coolant loop; and receiving second temperature data associated with a second temperature of the second coolant loop, wherein the controlling comprises increasing an amount of the fluid transferred between the first coolant loop and the second coolant loop based at least in part on a difference between the first temperature and the second temperature.

Q. The non-transitory computer-readable medium as paragraph P recites, wherein the first temperature indicates a first coolant outlet temperature of a first radiator disposed at the first end of the vehicle, and the second temperature indicates a second coolant outlet temperature of a second radiator disposed at the second end of the vehicle.

R. The non-transitory computer-readable medium as paragraph O recites, wherein the operations further comprise actuating at least one valve to transfer the fluids between the first coolant loop and the second coolant loop, wherein the at least one valve is thermally coupled to the first coolant loop and the second coolant loop.

S. The non-transitory computer-readable medium as paragraph O recites, wherein each of the first coolant loop and the second coolant loop includes a respective pump and a respective valve, and the controlling further comprises operating at least one of the respective pumps or the respective valves to generate a pressure gradient between the first coolant loop and the second coolant loop, causing the transfer of the thermal energy between the first coolant loop and the second coolant loop.

T. The non-transitory computer-readable medium as paragraph S recites, further comprising closing the valves to isolate the first coolant loop from the second coolant loop.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A vehicle comprising:

a first drive motor associated with a first end of the vehicle;

a first radiator associated with the first end;

a second drive motor associated with a second end of the vehicle, the second end being opposed to the first end;

a second radiator associated with the second end;

a first coolant loop thermally coupled to the first drive motor and the first radiator;

a second coolant loop thermally coupled to the second drive motor and to the second radiator;

a conduit thermally coupling the first coolant loop with the second coolant loop; and a controller configured to control transfer of thermal energy between the first coolant loop and the second coolant loop via the conduit based at least in part on a direction of travel of the vehicle, wherein either the first end or the second end is a leading end for the direction of travel of the vehicle.

2. The vehicle of claim 1, further comprising:

a first pump associated with the first coolant loop; and a second pump associated with the second coolant loop, wherein the controller is configured to control the first pump or the second pump to transfer the thermal energy between the first coolant loop and the second coolant loop via the conduit.

3. The vehicle of claim 1, further comprising:

at least one valve associated with at least one of the first coolant loop, the second coolant loop, and the conduit, wherein the controller is configured to actuate the valve to control the transfer of thermal energy between the first coolant loop and the second coolant loop.

4. The vehicle of claim 3, wherein the controller is configured to, based at least in part on detection of a fault in the vehicle, close the valve to isolate the first coolant loop from the second coolant loop.

5. The vehicle of claim 1, further comprising:

a first temperature sensor configured to detect a first temperature associated with the first coolant loop; and a second temperature sensor configured to detect a second temperature associated with the second coolant loop, wherein the controller is configured to control transfer of the thermal energy based at least in part on the difference between the first temperature and the second temperature.

6. The vehicle of claim 1, further comprising:

a sensor configured to determine the speed of the vehicle, wherein the controller is configured to control transfer of the thermal energy based at least in part on the speed of the vehicle.

7. The vehicle of claim 1, wherein the first coolant loop comprises a plurality of first coolant loops, one of which is a first phase change loop, and the second coolant loop comprises a plurality of second coolant loops, one of which is a second phase change loop, wherein the controller is configured to transfer the thermal energy between the first phase change loop and the second phase change loop.

* * * * *